(12) United States Patent
Sauer

(10) Patent No.: US 8,590,774 B1
(45) Date of Patent: Nov. 26, 2013

(54) REUSABLE SHIPPING CONTAINERS AND MAILING ENVELOPES

(76) Inventor: Jeffrey S Sauer, Mill Creek, WA (US)

( * ) Notice: Subject to any disclaimer, the term of this patent is extended or adjusted under 35 U.S.C. 154(b) by 605 days.

(21) Appl. No.: 12/695,063

(22) Filed: Jan. 27, 2010

(51) Int. Cl.
*B65D 17/46* (2006.01)
(52) U.S. Cl.
USPC .......................... 229/239; 229/241; 220/265
(58) Field of Classification Search
USPC ............... 229/239, 138, 223, 244, 139, 241, 229/101.2, 210, 211, 212, 207, 101.1; 220/275; 222/153.07
See application file for complete search history.

(56) References Cited

U.S. PATENT DOCUMENTS

| 211,725 A | 1/1879 | Foster |
| 754,201 A | 3/1904 | Davalos |
| 1,896,425 A | 2/1933 | Scarfi |
| 2,859,907 A | 11/1958 | McFarland |
| 3,638,853 A * | 2/1972 | Perry ............................ 229/223 |
| 3,650,463 A | 3/1972 | Christiansen et al. |
| 3,733,025 A | 5/1973 | Hiersteiner |
| 4,412,619 A * | 11/1983 | Van Laer ....................... 229/222 |
| 4,434,896 A * | 3/1984 | Beloate et al. ................. 229/223 |
| 4,548,318 A * | 10/1985 | Boyle ............................ 229/221 |
| 4,570,416 A | 2/1986 | Shoenfeld |
| 4,752,028 A * | 6/1988 | Ogura ........................... 229/102 |
| 4,795,035 A | 1/1989 | Kim |
| 4,819,807 A | 4/1989 | Giger |
| 5,271,553 A | 12/1993 | Kim |
| 5,370,461 A | 12/1994 | Smith et al. |
| 5,503,328 A | 4/1996 | Roccaforte et al. |
| 5,516,040 A | 5/1996 | Lin |
| 7,178,713 B2 | 2/2007 | Stude |
| 2003/0201315 A1 * | 10/2003 | Jamison et al. ............... 229/102 |

* cited by examiner

*Primary Examiner* — Nathan J Newhouse
*Assistant Examiner* — Christopher Demeree
(74) *Attorney, Agent, or Firm* — Edward B. Weller

(57) ABSTRACT

A reusable item shipping container comprises a housing that is configured to retain an item therein and has an opening for inserting or removing the item therefrom. First and second sealing flaps are disposed on the housing adjacent the opening. In a first configuration, the first sealing flap is configured to be folded into the housing or across the opening and the second sealing flap is configured to be folded over the opening to seal the housing. In a second configuration, the first sealing flap is configured to be folded across the opening and to seal the housing after the second folding flap has sealed the opening and the item shipping container has been opened.

16 Claims, 28 Drawing Sheets

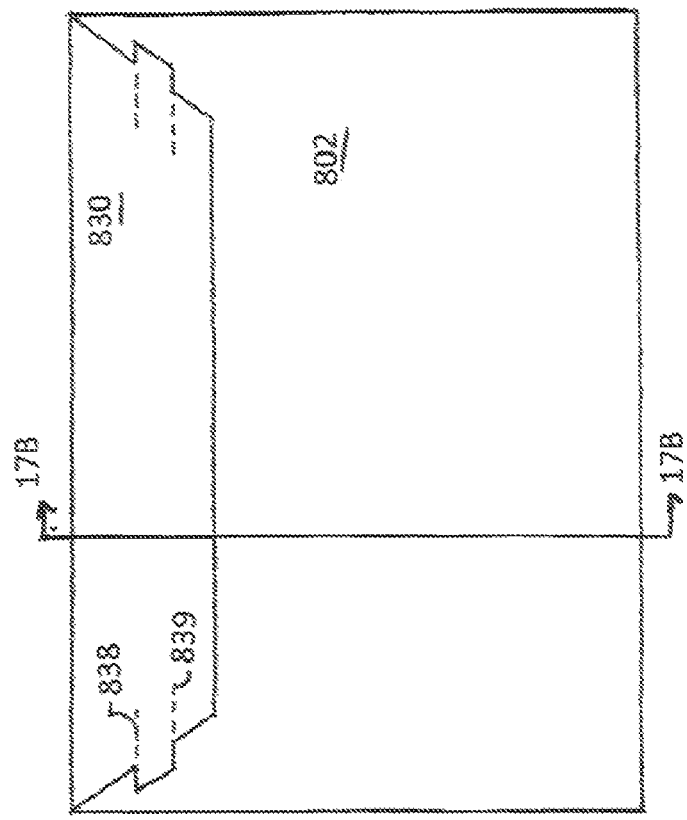
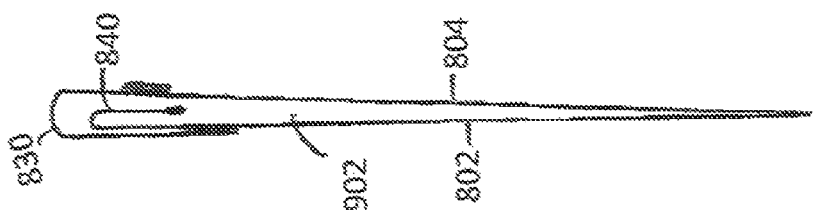

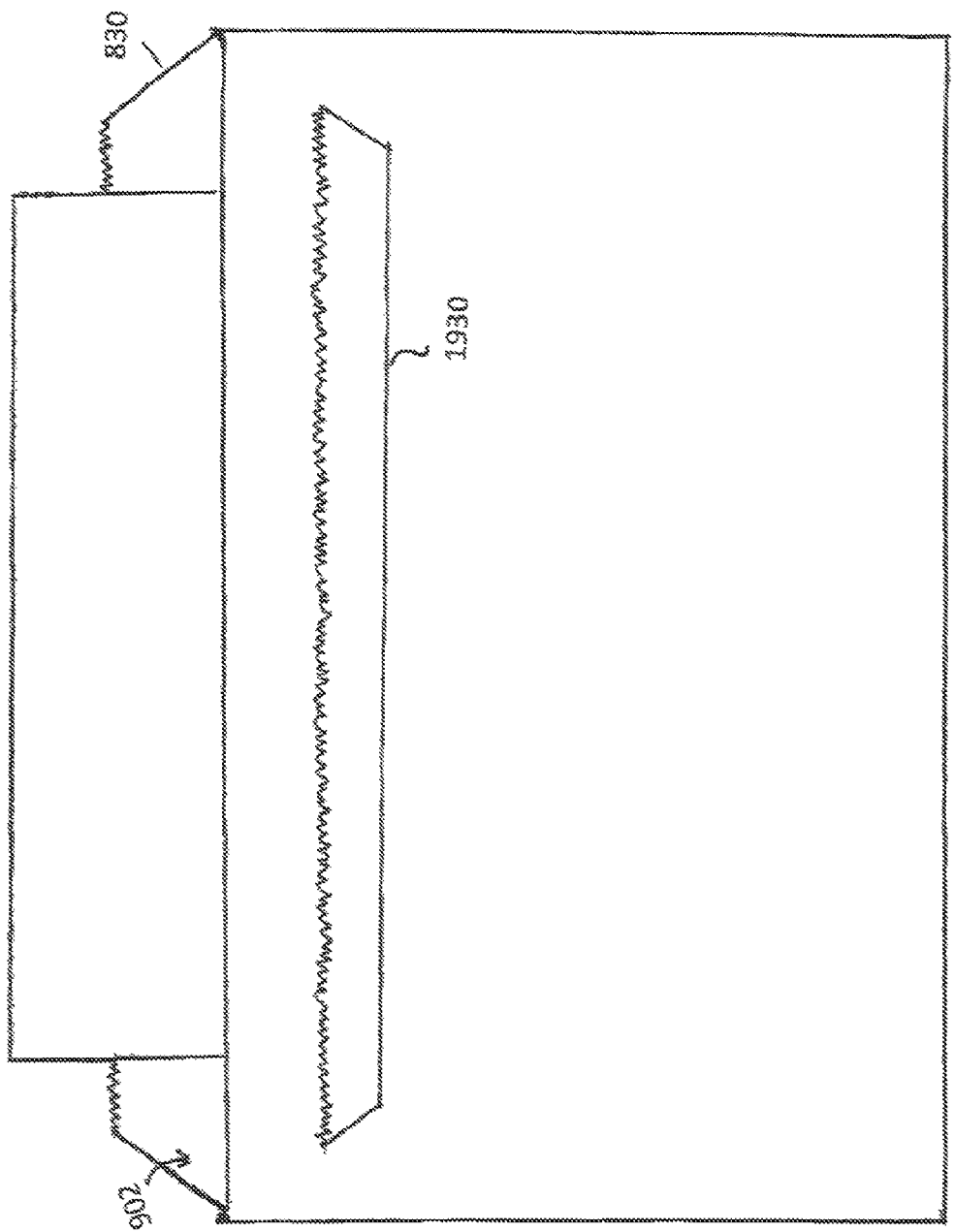

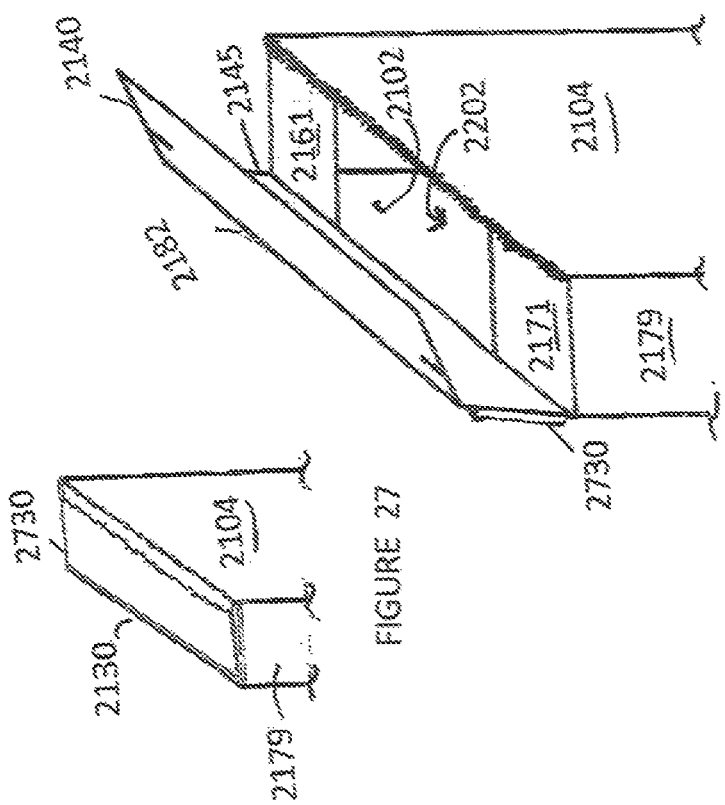

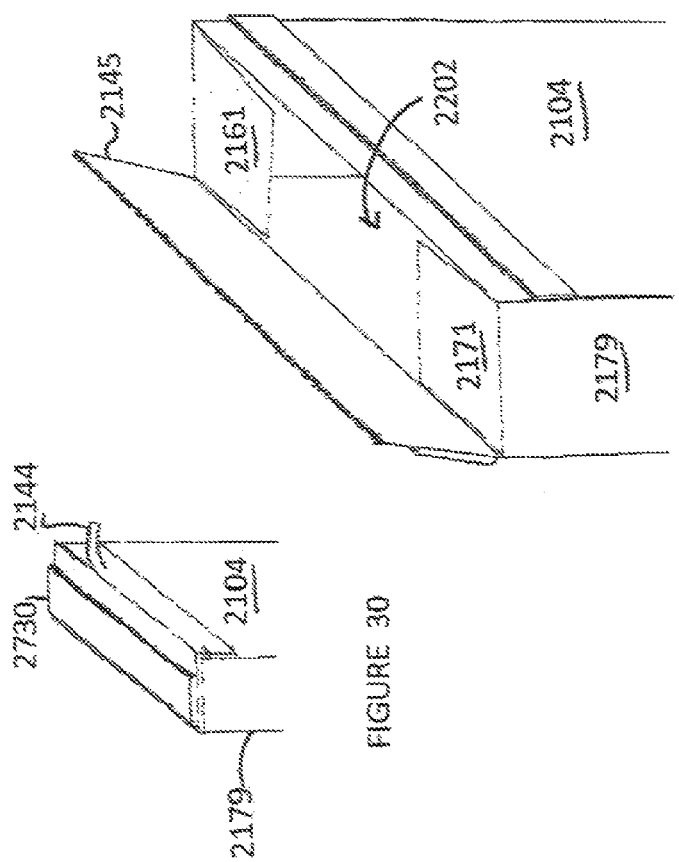

REUSABLE SHIPPING CONTAINERS AND MAILING ENVELOPES

BACKGROUND

The present invention relates to mailing containers and envelopes.

Various envelopes have been proposed for easy opening that use perforation lines, tear strips or tear strings.

U.S. Pat. No. 211,725 (to Foster) describes an envelope having perforation lines near the end of the envelope to form a strip that is torn off to open the envelope. To avoid tearing the contents of the envelope when opening the envelope, the perforation lines must be near an end of the envelope. The portion of the envelope that is to be pulled is difficult to grasp with a sufficient grip when tearing the envelope along the perforation line.

U.S. Pat. No. 754,201 (to Davalos) describes an envelope having a tear strip extending on the length of the closure flap with a cut on the side of the tear-strip. A pair of notches may be formed to produce a tongue on the tear-strip that facilitates grasping the tear-strip. However, the tear strip is difficult to grasp without a tool or letter opener to pull the pull tab away from the envelope.

U.S. Pat. No. 1,896,425 (to Scarfi) also describes an envelope that includes an opening string that is pulled to open the envelope without using a tool or letter opener. The ends of the opening strings extend beyond the ends of the envelope. However, these strings can damage automated letter processing equipment or may be inadvertently pulled to open the envelope.

U.S. Pat. No. 2,859,907 (to McFarland) describes an envelope having a pull tab formed with a tape. Lines of weakness are disposed on either one side or both sides of the tape. The envelope is opened by pulling the pull tab along with the tape. The pull tab requires the manufacture and use of a tape formed of multiple layers. Thus, the manufacturing of the envelope with the tape is complex.

U.S. Pat. No. 3,650,463 (to Christiansen et al.) describes an envelope with a self-contained envelope opening strip. A pull tab is formed by severing one end of the envelope in alignment with the perforations. However, the pull tab is difficult to grasp without a tool or letter opener to pull the pull tab away from the envelope.

U.S. Pat. No. 3,733,025 (to Hiersteiner et al.) describes an envelope that includes a closure flap with a tear perforation line. The closure flap has an adhesive strip between the tear perforation line and the edge of the closure flap. The back panel has an adhesive strip that engages the adhesive strip on the closure flap when the envelope is sealed. The adhesive strips are formed of a material that seals but permits separation without damage to the paper. The sealing of the envelope lacks security integrity because of the unsealable nature of the adhesive.

U.S. Pat. No. 4,795,035 (to Kim) is directed to an envelope including a pull tab having a thread on an inside surface of the envelope and non-tearable strips disposed on opposite sides of and parallel to the thread and attached to an outside surface of the envelope. The pull tab and thread are pulled away from the envelope along a tear line between the non-tearable strips. However, the adhesive sealing the pull tab releasably seals the pull tab to the envelope. Thus, the envelope requires two types of adhesives: one to seal the envelope, and other for the pull tab.

U.S. Pat. No. 4,819,807 (to Giger) describes a tear-strip opening envelope that includes a tear-strip on each of two panels that enclose the envelope. Upon sealing of the envelope, the two-strips overly each other to create a single multi-ply tear strip assembly for opening the envelope by pulling the single multi-ply tear strip assembly. This envelope requires two adhesive strips that must be carefully aligned when the envelope is sealed to create the multi-ply tear strip.

U.S. Pat. No. 7,178,713 (to Stude) describes an easy open envelope that includes a sealing flap with a corner section with indicia where to pull the corner section. The sealing flap also has an adhesive material that extends along the sealing flap, but does not extend into the corner section. When sealed, the corner section does not adhere to the panel, and thus can be lifted and torn along a perforated line to allow a finger or tool to be inserted under the sealing flap so that the sealing flap can be torn. However, the finger or tool can damage the contents of the envelope.

Various reusable envelopes have been proposed.

U.S. Pat. No. 1,896,425 (to Scarfi) describes an envelope that may be used more than once for mailing. The envelope includes a closure flap comprising two strips, a main closure strip, which has its obverse surface treated with glue, and an auxiliary closure flap continuing therefrom. The auxiliary flap is folded over to lie flat upon the main flap but does not adhere to the glued surface of the latter. The main closure strip must be sealed first in order for the envelope to be resealable. Accordingly, an incorrect order of sealing prevents the envelope from being used more than once.

U.S. Pat. No. 7,178,713 (to Stude) describes an easy open resealable envelope (see, e.g., FIGS. 5 and 6). The front panel of the resealable envelope extends above the back panel, and includes a closure flap having two parallel adhesive regions that do not extend into a corner region for easy opening as described above. The upper adhesive region is used to seal the envelope for the first sealing, and the envelope is opened using the corner region to tear the closure flap. The lower adhesive region is used to seal the envelope for the second sealing. The upper adhesive must be used first for sealing the envelope. Otherwise, using the lower adhesive first to seal the envelope prevents the envelope from being used more than once. Accordingly, an incorrect order of sealing prevents the envelope from being used more than once. Also folding the closure flap at the perforation line above the lower adhesive region leaves a gap between the front panel and the closure flap that could allow access into the envelope or allow small items to fall out of the envelope.

U.S. Pat. No. 5,503,328 (to Roccaforte et al.) describes a resealable envelope that includes a closure flap having two parallel adhesive seal strips and two tear opening strips. The envelope is sealed by using one adhesive seal strip and opened using one tear opening strip. The envelope is resealed by using the other adhesive seal strip and opened using the other tear opening strip. However, the correct adhesive seal must be used first for the envelope to be resealable. Accordingly, an incorrect order of sealing prevents the envelope from being used more than once.

SUMMARY

A reusable item shipping container comprises a housing that is configured to retain an item therein and has an opening for inserting or removing the item therefrom. First and second sealing flaps are disposed on the housing adjacent the opening. In a first configuration, the first sealing flap is configured to be folded into the housing or across the opening and the second sealing flap is configured to be folded over the opening to seal the housing. In a second configuration, the first sealing flap is configured to be folded across the opening and to seal the housing after the second folding flap has sealed the opening and the item shipping container has been opened.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

FIGS. 17a and 17b are plan view and cross-sectional view along a line 17b-17b of FIG. 17a, respectively, illustrating the reusable envelope of FIG. 16 released with the second sealing flap.

FIG. 20 is a plan view illustrating the opened reusable envelope of FIG. 19 with the second tear strip completely removed.

FIG. 27 is a partial perspective view illustrating the mailing box with a first tear strip completely removed.

FIG. 28 is a partial perspective view illustrating the mailing box with a first tear strip completely removed and the mailing box opened.

FIG. 30 is a partial perspective view illustrating the mailing box with a second tear strip partially removed.

FIG. 31 is a partial perspective view illustrating the mailing box with the second tear strip completely removed and the mailing box opened.

DETAILED DESCRIPTION

Various embodiments are now described with reference to the figures where like reference numbers indicate identical or functionally similar elements. Also in the figures, the left most digits of each reference number corresponds to the figure in which the reference number is first used.

Reference in the specification to "some embodiments" means that a particular feature, structure, or characteristic described in connection with these embodiments is included in at least one embodiment of the invention. The references of the phrase "in some embodiments" in various places in the specification are not necessarily all referring to the same embodiment.

Figure 1:
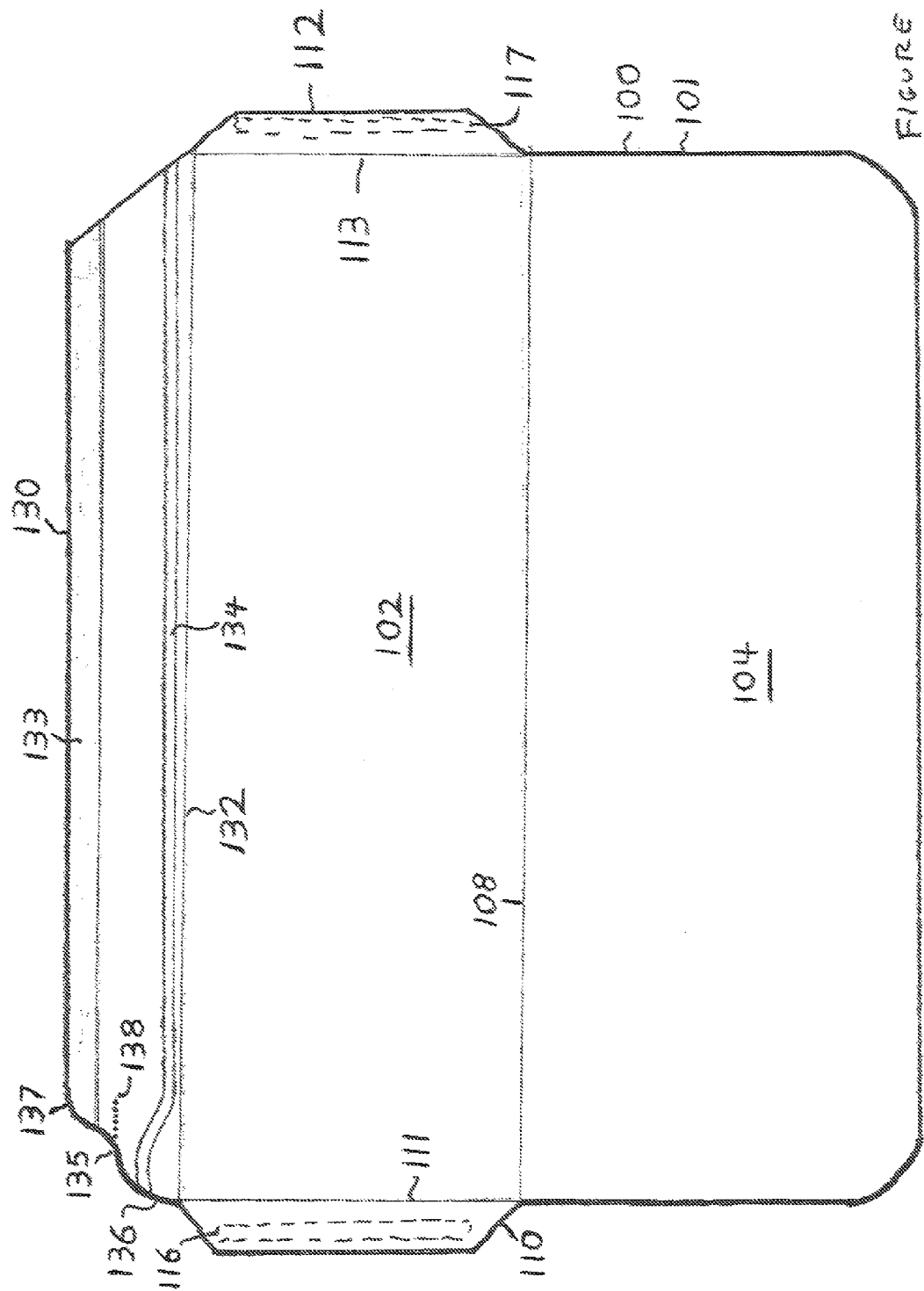
FIG. 1 is a plan view illustrating an unfolded envelope blank of an easily openable envelope.

FIG. 1 is a plan view illustrating an unfolded envelope blank 100 of an easily openable envelope 101. A front panel 102 is foldably coupled to and integral with a back panel 104 along a fold line 108 to enable the back panel 104 to be folded towards an interior surface of the front panel 102. (The surfaces shown in FIG. 1 are the interior surfaces of the front panel 102 and the back panel 104 where interior and exterior are in reference to the envelope 101 when assembled as described below.)

A closure flap 110 is foldably coupled to and integral with the front panel 102 along a fold line 111 that may be perpendicular to the fold line 108. The closure flap 110 may be formed in a generally trapezoidal shape having the long side along the fold line 111. A closure adhesive region 116 is disposed longitudinally parallel to the fold line 111 and on an exterior surface of the closure flap 110.

A closure flap 112 is foldably coupled to and integral with the front panel 102 along a fold line 113 that may be perpendicular to the fold line 108. The closure flap 112 may be formed in a generally trapezoidal shape having the long side along the fold line 113. A closure adhesive region 117 is disposed longitudinally parallel to the fold line 113 and on an exterior surface of the closure flap 112.

Figure 2:
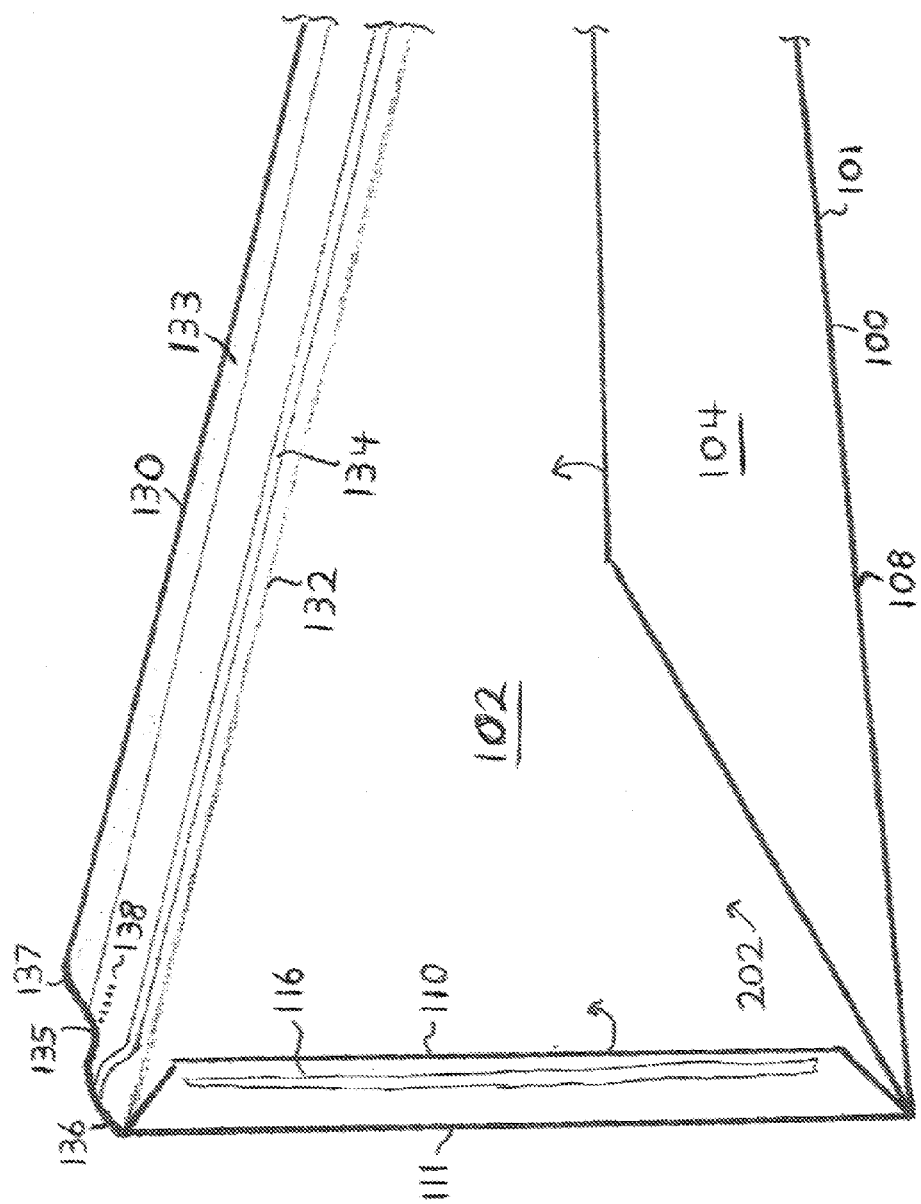
FIG. 2 is a partial perspective view illustrating an easily openable envelope partially assembled from the envelope blank of FIG. 1.
Figure 3:
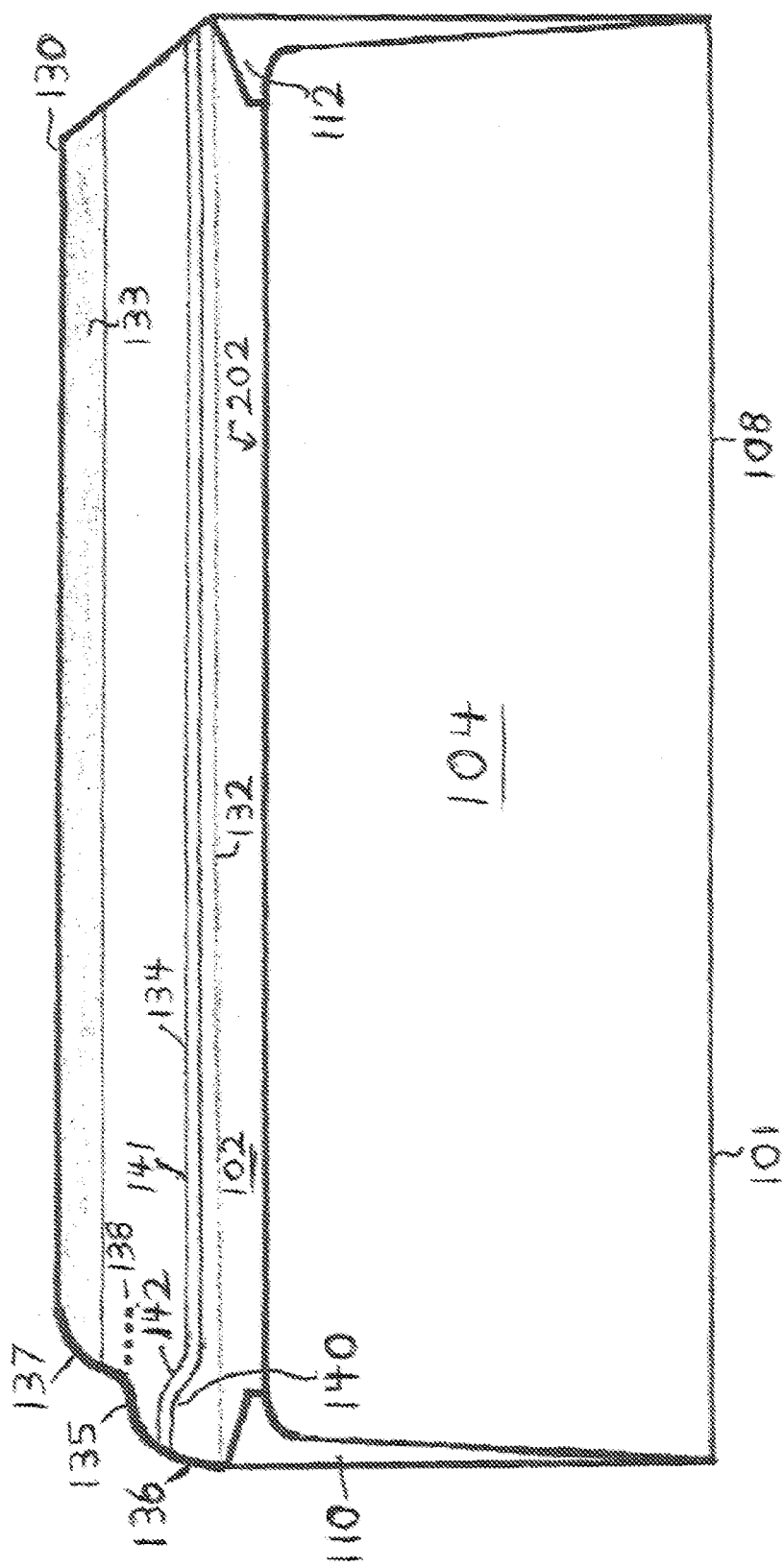
FIG. 3 is a plan view illustrating an unsealed easily openable envelope assembled from the envelope blank of FIG. 1.

FIG. 2 is a partial perspective view illustrating an easily openable envelope 101 partially assembled from the envelope blank 100. FIG. 3 is a plan view illustrating an unsealed easily openable envelope assembled from the envelope blank 100. The front panel 102 and the back panel 104 are folded toward each other along the fold line 108. The closure flaps 110 and 112 (not shown in FIG. 2) are folded along the fold lines 111 and 113, respectively, towards the front panel 102 to form a content retention region 202 therebetween. The closure adhesive regions 116 and 117 (and those described below) may be formed, for example, of an adhesive with a removable protective plastic strip cover over the adhesive, suitable two-sided adhesive tapes, pressure sensitive adhesives, or cohesives. The closure adhesive regions 116 and 117 (not shown in FIG. 2) are set into an adhesive state to engage and hold the back panel 104 after the back panel 104 is folded along the fold line 108 towards the front panel 102 to thereby contact the closure adhesive regions 116 and 117.

In some embodiments, the closure flaps 110 and 112 are foldably coupled to and integral with the back panel 104. In some embodiments, one of the closure flaps 110 and 112 is foldably coupled to and integral with the back panel 104, and the other one of the closure flaps 110 and 112 is foldably coupled to and integral with the front panel 102. One or both of the closure adhesive regions 116 and 117 may be on the interior surface of the closure flaps 110 and 112, respectively, to close the envelope 101 after the front panel 102 is folded towards the back panel 104.

Figure 4:
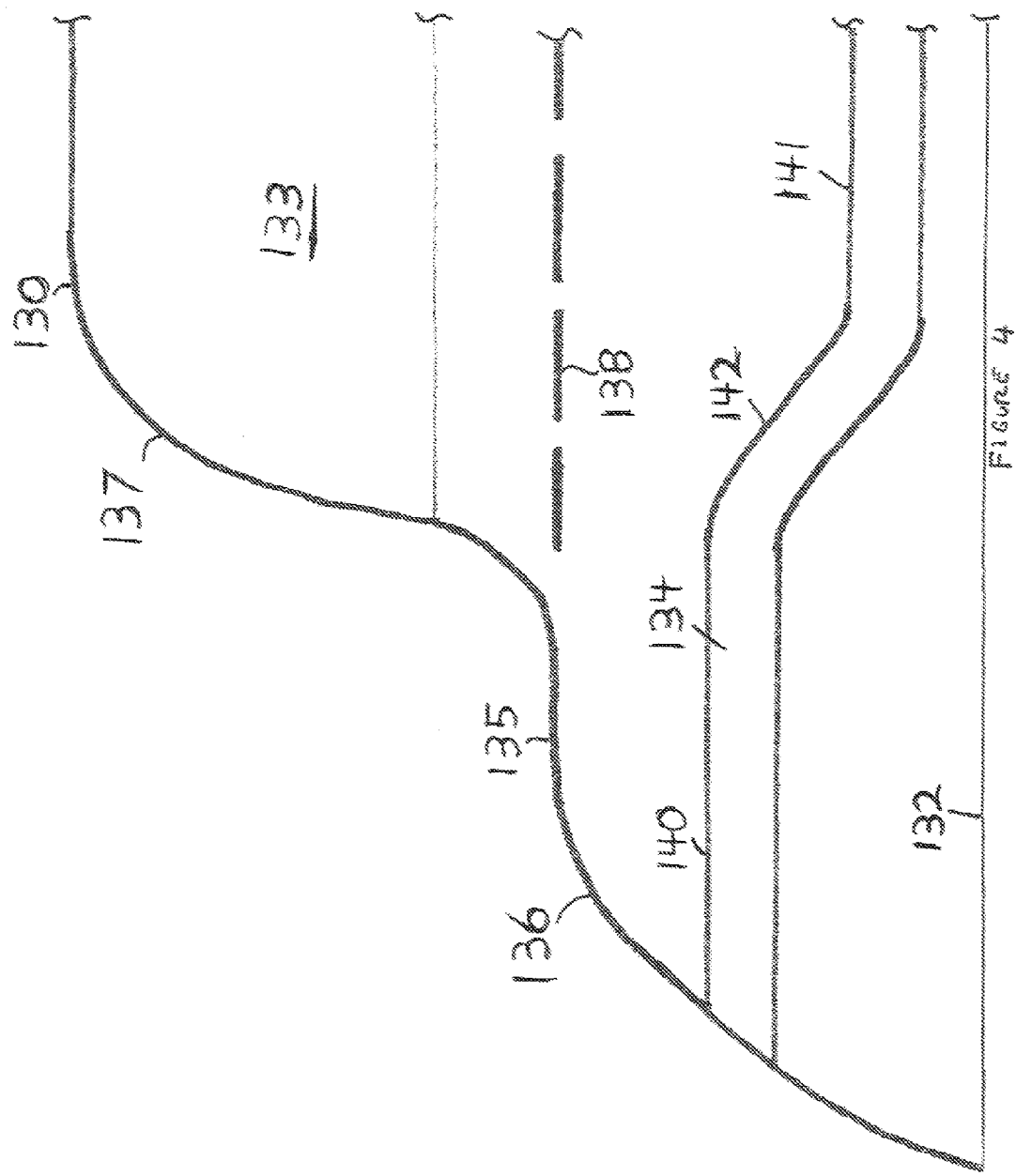
FIG. 4 is a partial view of a corner of the unsealed easily openable envelope of FIG. 3.

FIG. 4 is a partial view of a corner of the unsealed easily openable envelope 101. Referring to FIGS. 1, 3, and 4, a sealing flap 130 is foldably coupled to and integral with the front panel 102 along a fold line 132 that may be parallel to the fold line 108 on an opposite side of the front panel 102. In some embodiments, the fold line 132 is formed to be easily tearable, such as by perforations or a line of weakness. The sealing flap 130 may be formed in a generally trapezoidal shape having the long side along the fold line 132, except a tab region 135 along one edge of the sealing flap 130. The tab region 135 comprises a pull tab region 136 that is outwardly convex shaped and an end region 137 that is outwardly convex shaped. A sealing adhesive region 133 may be disposed parallel to the fold line 132 near the edge of the sealing flap 130 that is opposite the fold line 132. For the sake of simplicity and clarity, the sealing adhesive regions are described herein as an adhesive with a removable plastic strip cover over the adhesive: However, the sealing adhesive regions may be formed, for example, of an adhesive with a removable protective plastic strip cover over the adhesive, suitable two-sided adhesive tapes, pressure sensitive adhesives, or cohesives. The sealing adhesive region 133 seals the envelope in a closed configuration (see FIG. 5). A perforation line 138 extends along a portion of the length of the sealing flap 130, or alternatively along the entire length of the sealing flap 130, to enable opening of the envelope 101.

A tear strip 134 is an opening strip disposed on the sealing flap 130 to allow the envelope 101 to be opened with a single opening movement without excessive destruction of the envelope 101 or damaging the contents therein. The tear strip 134 has a first tear strip portion 140 that is substantially parallel to the fold line 132 and disposed in the tab region 135. The tear strip 134 also has a second tear strip portion 141 that is substantially parallel to the fold line 132 and disposed from the tab region 135 to the other end of the sealing flap 130. In some embodiments, the first tear strip portion 140 is closer to the fold line 132 than the second tear strip portion 141. The tear strip 134 also has a connection tear strip 142 connected between the first tear strip portion 140 and the second tear strip portion 141. In some embodiments, the tear strip 134 is formed of a single strip formed of the tear portions 140, 141, and 142. In some embodiments, the tear strip 134 is glued or similarly affixed to the sealing flap 130. The tear strip 134 may be formed of cotton threads, wool threads, synthetic threads, plastic, and the like.

Figure 5:
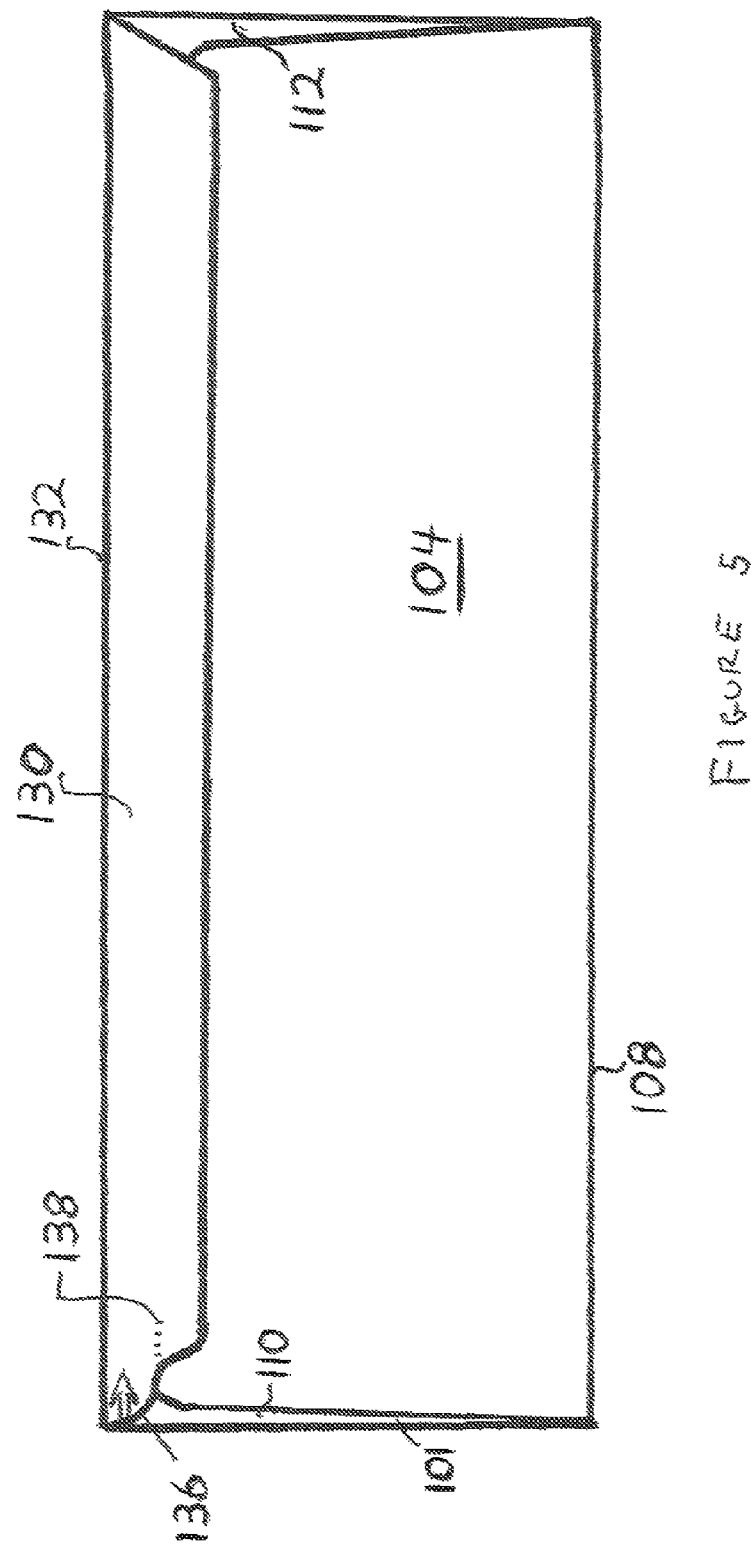
FIG. 5 is a plan view illustrating the easily openable envelope of FIG. 3 in a sealed configuration.

FIG. 5 is a plan view illustrating the easily openable envelope of FIG. 3 in a sealed configuration. Items may be inserted into the content retention region 202 before sealing the envelope 101. The envelope 101 is sealed by folding the sealing flap 130 along the fold line 132 towards the back panel 104. The sealing adhesive region 133 is set into an adhesive state (such as removing a plastic strip cover over an adhesive) to engage and hold the sealing flap 130 on the back panel 104 after the sealing flap 130 is folded along the fold line 132 towards the back panel 104 to thereby contact the sealing adhesive region 133 against the back panel 104. The sealed envelope 101 may be addressed and deposited with a delivery carrier.

Figure 6:
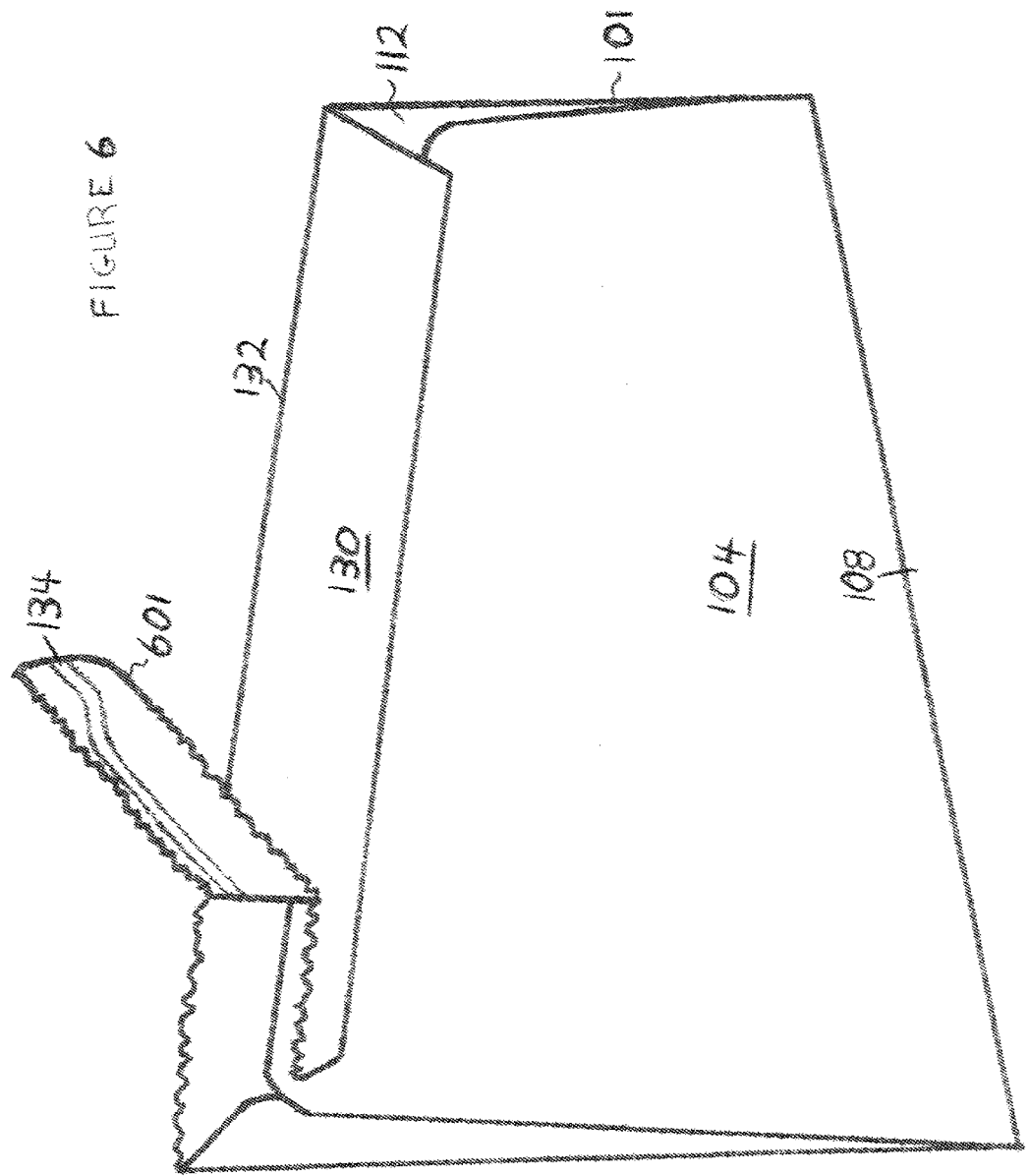
FIG. 6 is a perspective view illustrating the sealed easily openable envelope of FIG. 5 with a tear strip partially removed.
Figure 7:
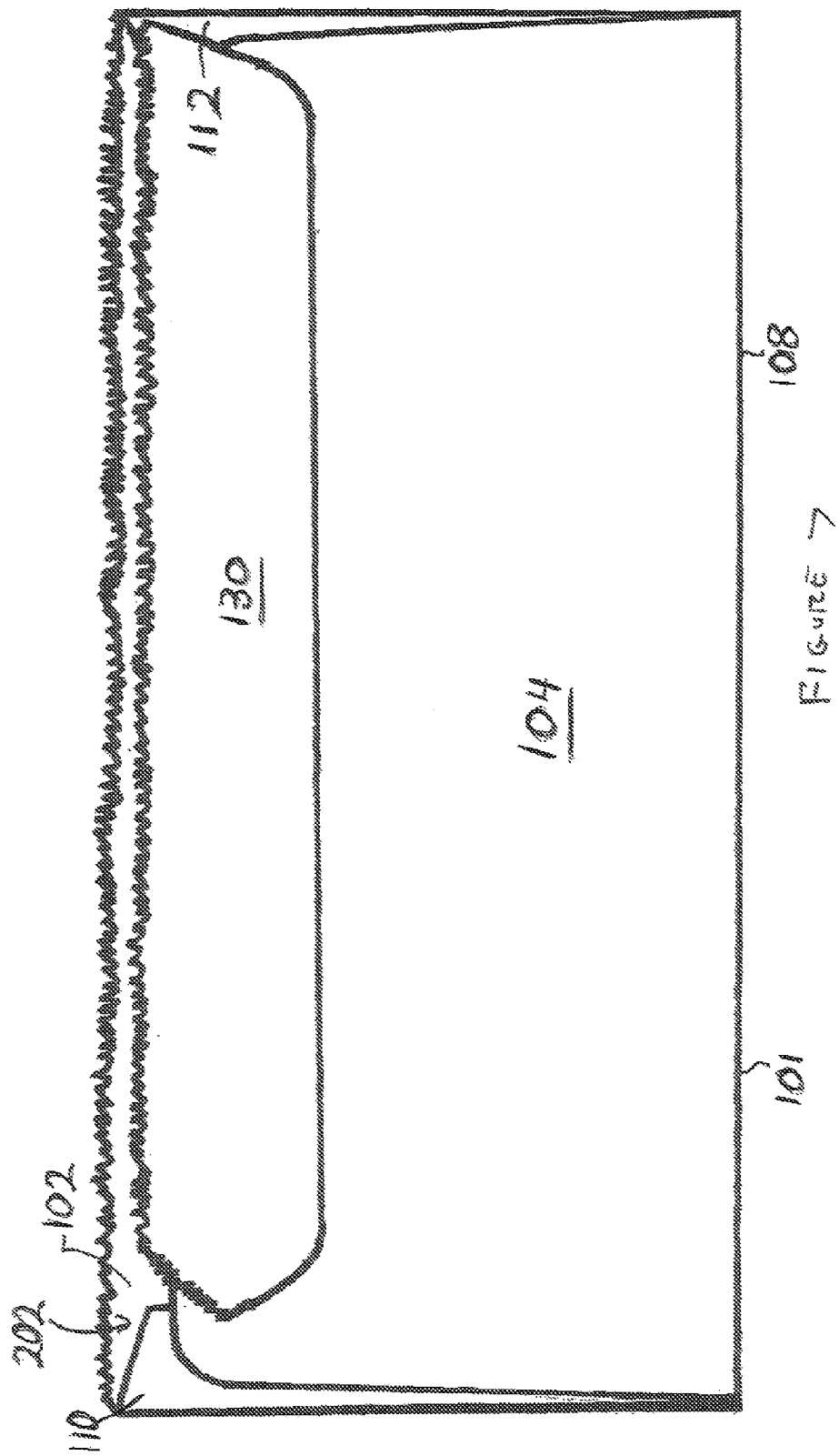
FIG. 7 is a plan view illustrating the sealed reusable envelope of FIG. 5 with the tear strip completely removed.

FIG. 6 is a perspective view illustrating the sealed easily openable envelope 101 with a tear strip 601 partially removed. FIG. 7 is a plan view illustrating the sealed easily openable envelope 101 with the tear strip 601 completely removed. The sealed easily openable envelope 101 may be opened by inserting a finger or thumb under and then holding the pull tab region 136, lifting the pull tab region 136, and pulling the pull tab region 136 along the length of the envelope 101 to tear the sealing flap 130 along the perforation line 138 and the fold line 132. The content retention region 202 is again exposed, enabling visual inspection and removal of the contents therein from the envelope 101. The sealed easily openable envelope 101 may be easily opened without the use of tools, such as a letter opener.

In some embodiments, the envelope 101 does not include the sealing adhesive region 133, and the mailing entity can seal the envelope itself which may be useful for automating mass mailings. Because the envelope 101 lacks pull tabs that extend beyond the end or away from the envelope 101, the envelope 101 is generally coplanar to automated handling.

Reusable envelopes are next described.

Figure 8:
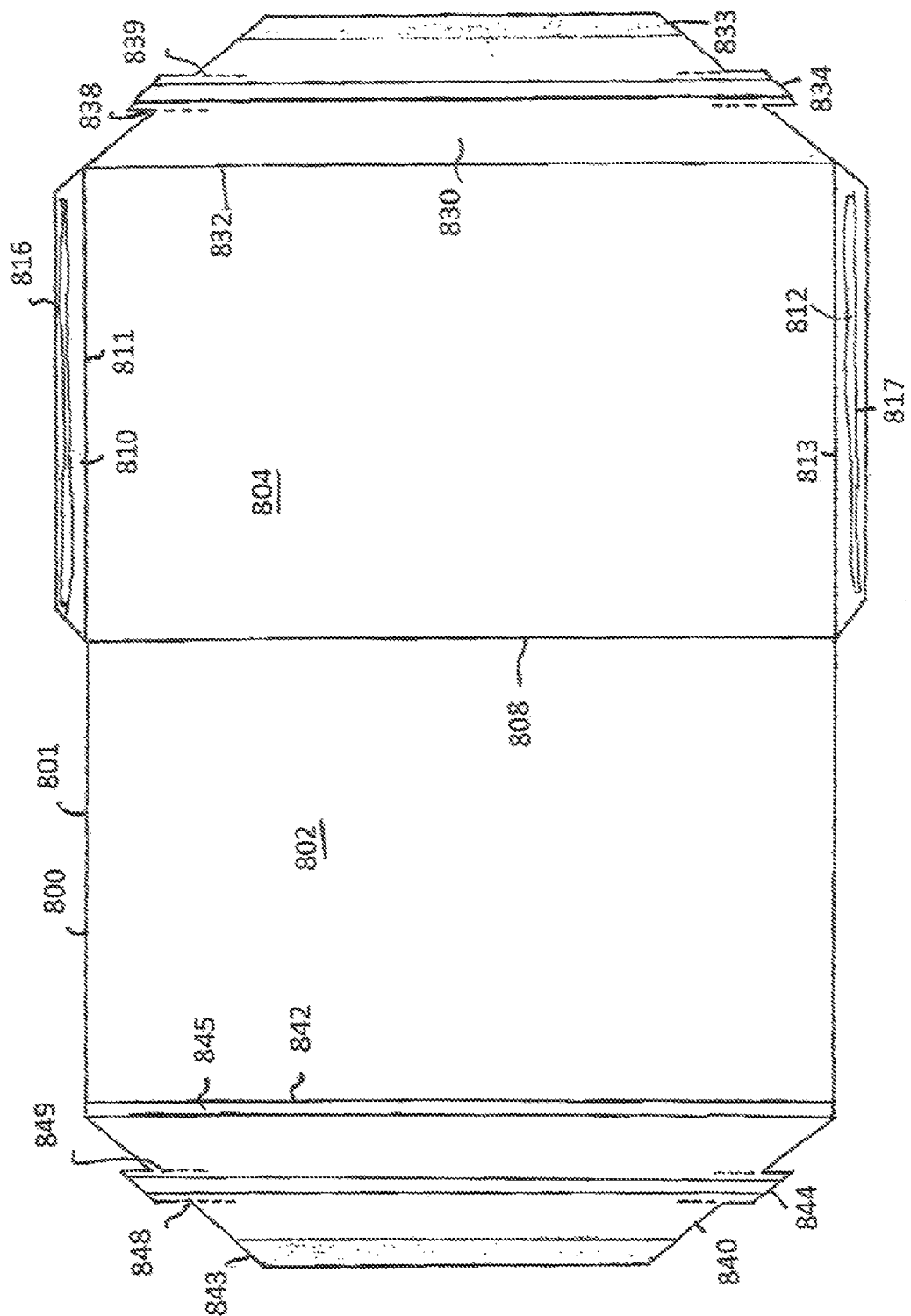
FIG. 8 is a plan view illustrating an unfolded envelope blank of a reusable envelope.

FIG. 8 is a plan view illustrating an unfolded envelope blank 800 of a reusable envelope 801. A first sender may use the reusable envelope 801 for a first delivery by sealing and addressing the envelope 801. A second sender, such as the recipient of the delivery from the first sender, may use the reusable envelope 801 for a second delivery by sealing and readdressing the envelope 801 without using external tape.

A back panel 802 is foldably coupled to and integral with a front panel 804 along a fold line 808 to enable the front panel 804 to be folded towards an interior surface of the back panel 802. (The surfaces shown in FIG. 8 are the interior surfaces of the back panel 802 and the front panel 804 where interior and exterior are in reference to the envelope 801 when assembled as described below.)

A closure flap 810 is foldably coupled to and integral with the front panel 804 along a fold line 811 that may be perpendicular to the fold line 808. The closure flap 810 may be formed in a generally trapezoidal shape having the long side along the fold line 811. A closure flap 812 is foldably coupled to and integral with the front panel 804 along a fold line 813 that may be perpendicular to the fold line 808. The closure flap 812 may be formed in a generally trapezoidal shape having the long side along the fold line 813. The closure flaps 810 and 812 each may include closure adhesive regions 816 and 817, respectively, in a similar manner as the closure adhesive regions 116 and 117 of FIG. 1.

A sealing flap 830 is foldably coupled to and integral with the front panel 804 along a fold line 832 that may be parallel to the fold line 808 on an opposite side of the front panel 804.

The sealing flap 830 may be formed in a generally trapezoidal shape having the long side along the fold line 832. A sealing adhesive region 833 may be disposed parallel to the fold line 832 near the edge of the sealing flap 830 that is opposite the fold line 832. The sealing adhesive region 833 seals the envelope in a closed configuration (see FIG. 11). A tear strip 834 extends along the length of the sealing flap 830 to enable opening of the envelope 801 by pulling the tear strip 834. Perforation lines 838 and 839 are disposed on opposite sides of the tear strip 834 and extend along the length of the sealing flap 830 to enable opening of the envelope 801 by forming lines of weakness when the tear strip 834 is pulled.

A sealing flap 840 is foldably coupled to and integral with the back panel 802 along a fold line 842 that may be parallel to the fold line 808 on an opposite side of the back panel 802. The sealing flap 840 may be formed in a generally trapezoidal shape having the long side along the fold line 842. In some embodiments, the sealing flap 840 includes an extension region 845 disposed adjacent the fold line 842 to extend the sealing flap 840 to be higher than the sealing flap 830. (The extension region 845 may compensate for practical implementation of folding the sealing flap 840 over the opening of the envelope 801, such as compensation for the thickness of the material of the envelope blank 800 or the contents stored in the envelope 801.). A sealing adhesive region 843 may be disposed parallel to the fold line 842 near the edge of the sealing flap 840 that is opposite the fold line 842. The sealing adhesive region 843 seals the envelope in a closed configuration (see FIG. 11). A tear strip 844 extends along the length of the sealing flap 840 to enable opening of the envelope 801 by pulling the tear strip 844. Perforation lines 848 and 849 are disposed on opposite sides of the tear strip 844 and extend along the length of the sealing flap 840 to enable opening of the envelope 801 by forming lines of weakness when the tear strip 844 is pulled.

Figure 9:
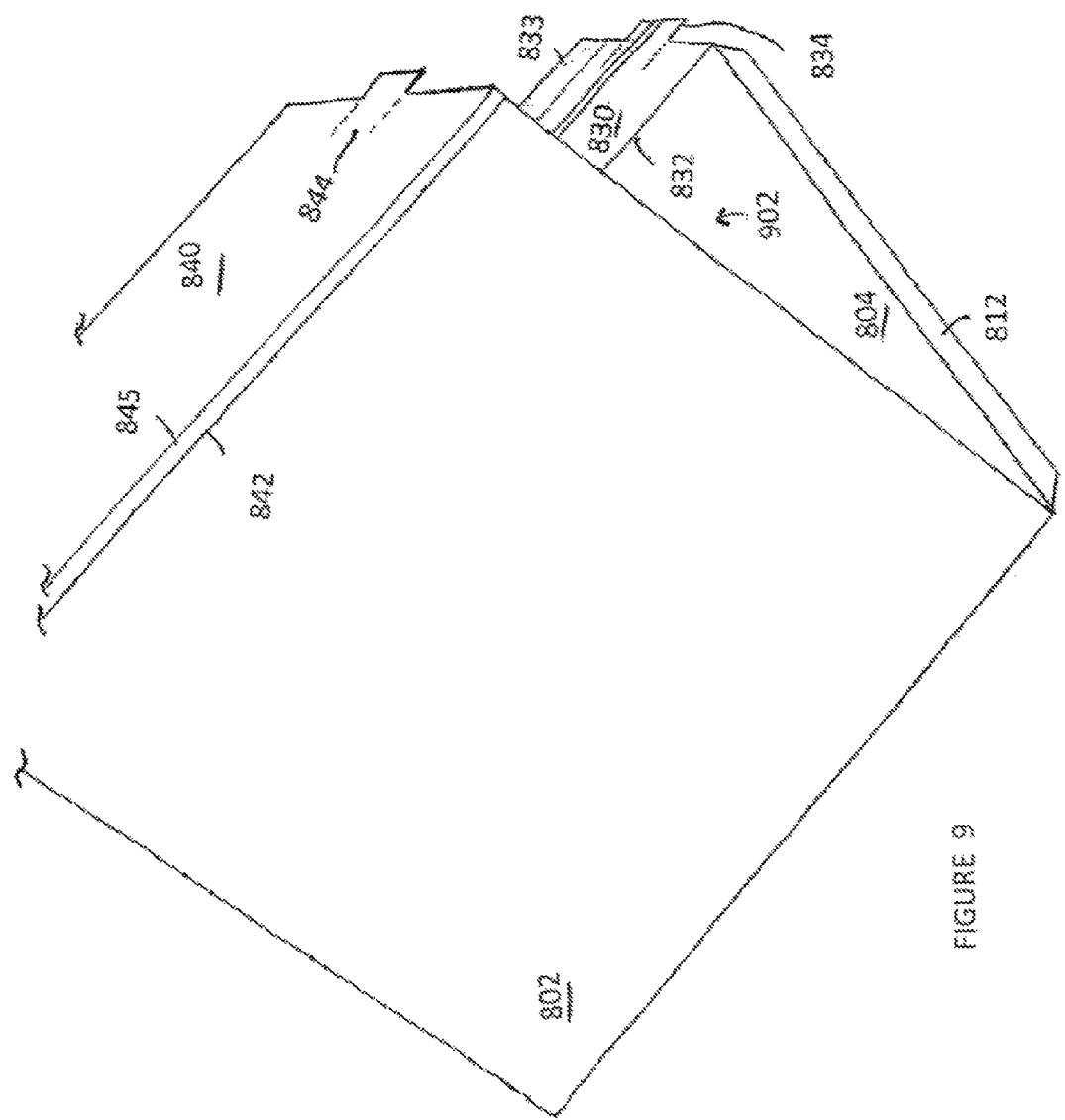
FIG. 9 is a partial perspective view illustrating a reusable envelope partially assembled from the envelope blank of FIG. 8.
Figure 10:
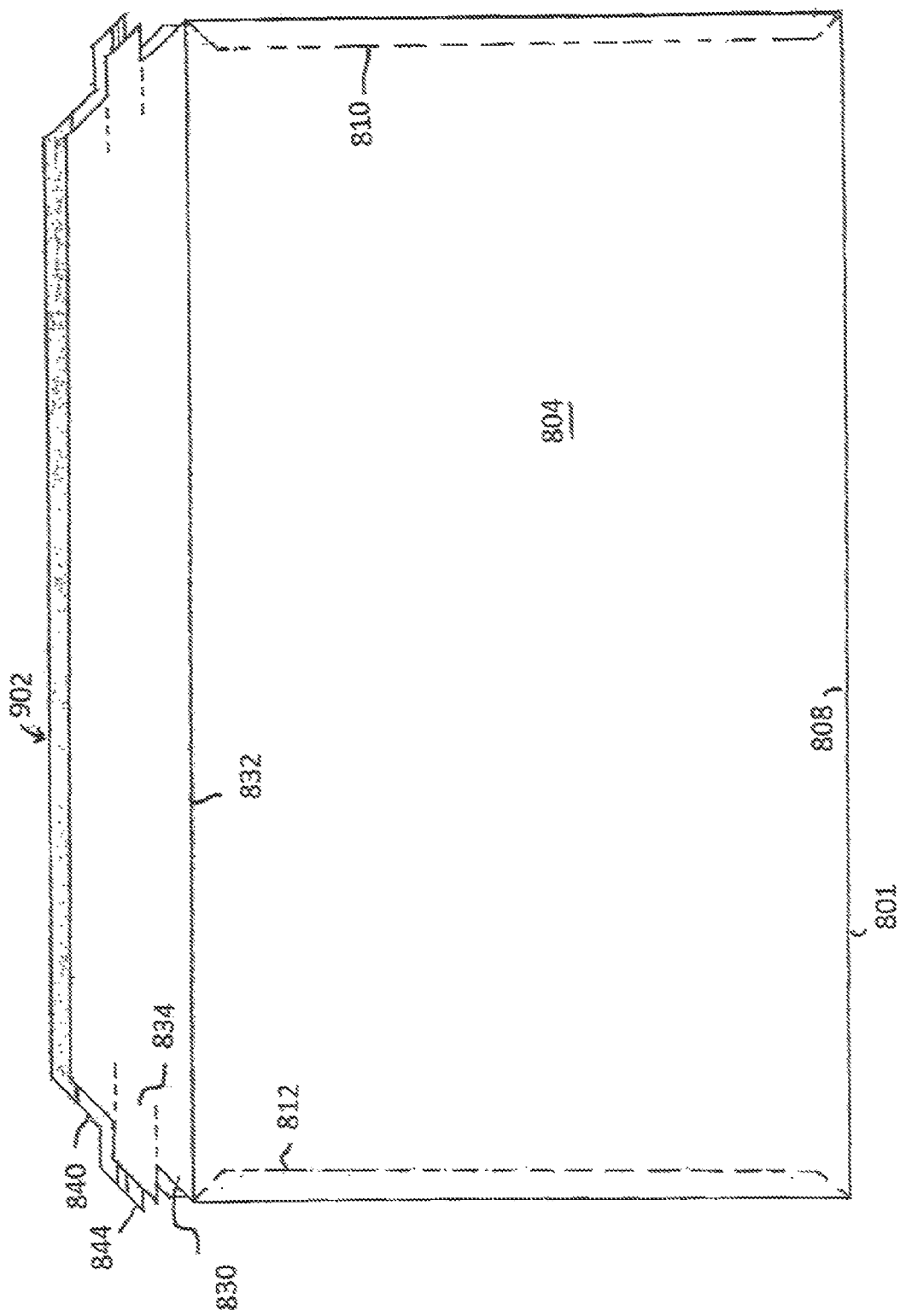
FIG. 10 is a plan view illustrating an unsealed reusable envelope assembled from the envelope blank of FIG. 8.

FIG. 9 is a partial perspective view illustrating a reusable envelope 801 partially assembled from the envelope blank 800. FIG. 10 is a plan view illustrating an unsealed reusable envelope 801 assembled from the envelope blank 800. The back panel 802 and the front panel 804 are folded toward each other along the fold line 808. The closure flaps 810 and 812 (not shown in FIG. 9) are folded along the fold lines 811 and 813, respectively, towards the back panel 802 to form a content retention region 902 therebetween. The closure adhesive regions 816 and 817 (not shown in FIG. 9) are set into an adhesive state to engage and hold the front panel 804 after the front panel 804 is folded along the fold line 808 towards the back panel 802 to thereby contact the closure adhesive regions 816 and 817.

In some embodiments, the closure flaps 810 and 812 are foldably coupled to and integral with the front panel 804. In some embodiments, one of the closure flaps 810 and 812 is foldably coupled to and integral with the front panel 804, and the other one of the closure flaps 810 and 812 is foldably coupled to and integral with the back panel 802. One or both of the closure adhesive regions 816 and 817 may be on the interior surface of the closure flaps 810 and 812, respectively, to close the envelope 801 after the front panel 802 is folded towards the back panel 802.

Figure 11:
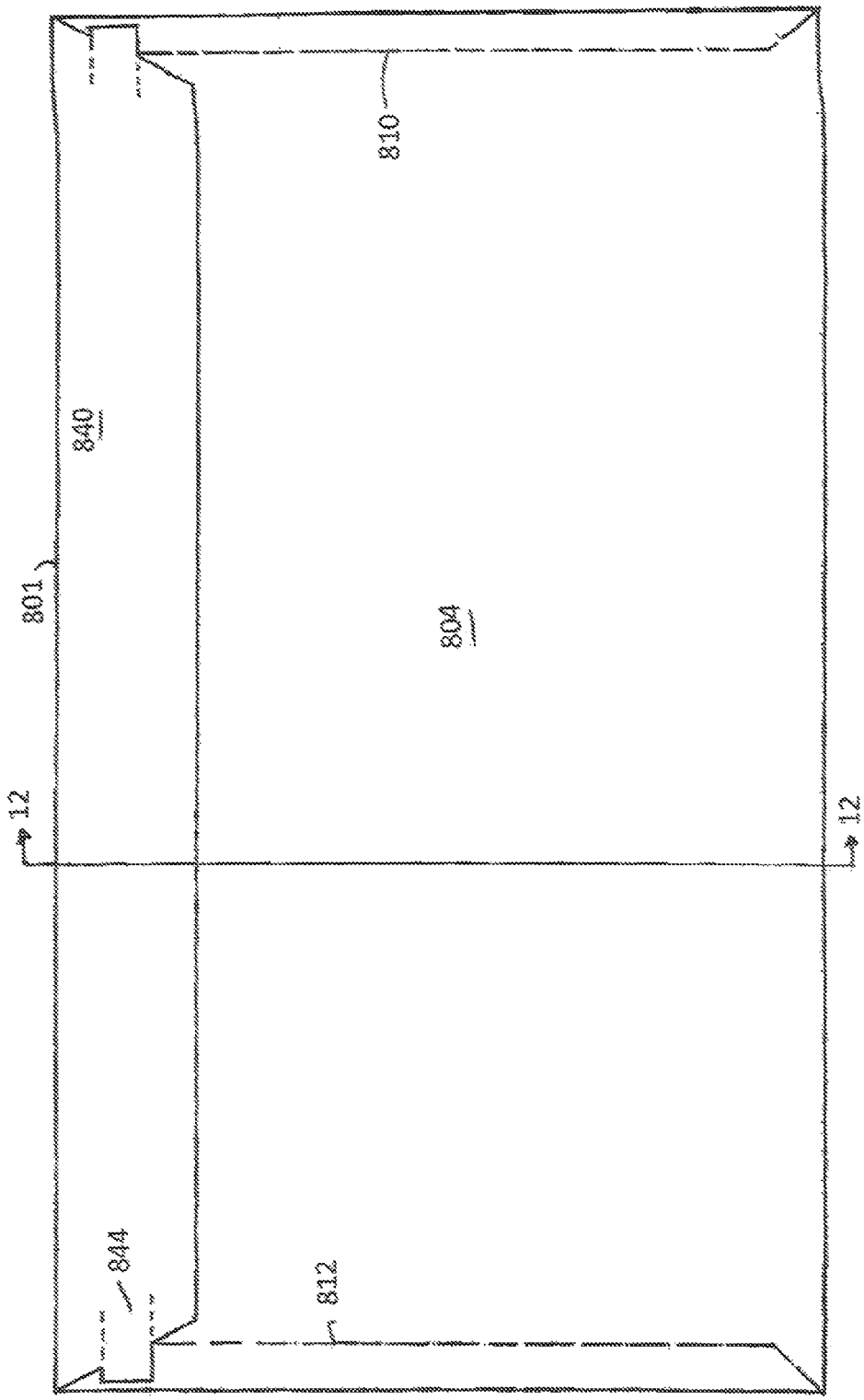
FIG. 11 is a plan view illustrating the reusable envelope of FIG. 10 in a sealed configuration.
Figure 12:
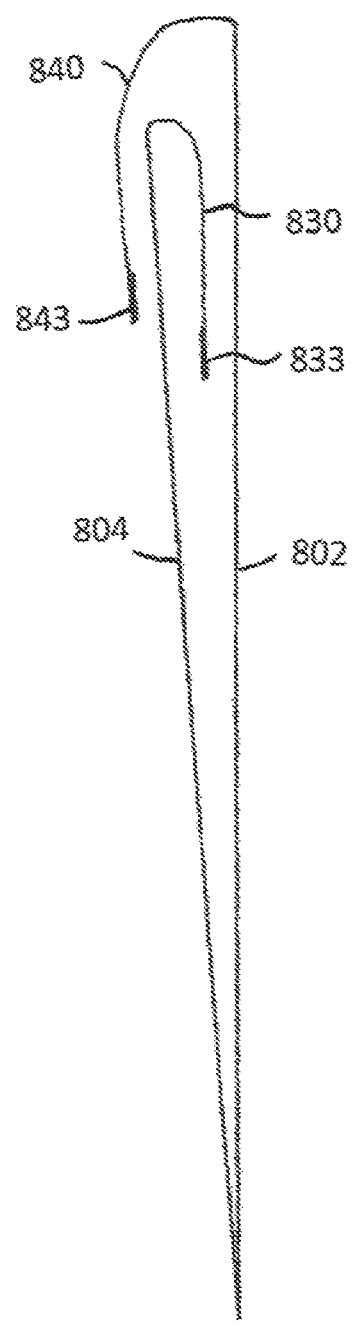
FIG. 12 is a cross-section view along a line 12-12 of the sealed reusable envelope of FIG. 11.

FIG. 11 is a plan view illustrating the reusable envelope 801 of FIG. 10 in a sealed configuration. FIG. 12 is a cross-section view along a line 12-12 of the sealed reusable envelope 801 of FIG. 11. In the initial sealing of the envelope 801, either the sealing flap 830 or the sealing flap 840 may be used to seal the envelope 801. A first configuration is described in conjunction with FIGS. 11-14 in which the sealing flap 840 is used to first seal the envelope 801. The sealing flap 830 is folded along the fold line 832 so that the sealing flap 830 is in the content retention region. The envelope 801 is sealed by folding the sealing flap 840 along the fold line 842 towards the front panel 804. The sealing adhesive region 843 is set into an adhesive state (such as removing a plastic strip cover over an adhesive) to engage and hold the sealing flap 840 on the front panel 804 after the sealing flap 840 is folded along the fold line 842 towards the front panel 804 to thereby contact the sealing adhesive region 843 against the front panel 804. The sealed envelope 801 may be addressed and deposited with a delivery carrier.

Figure 14:
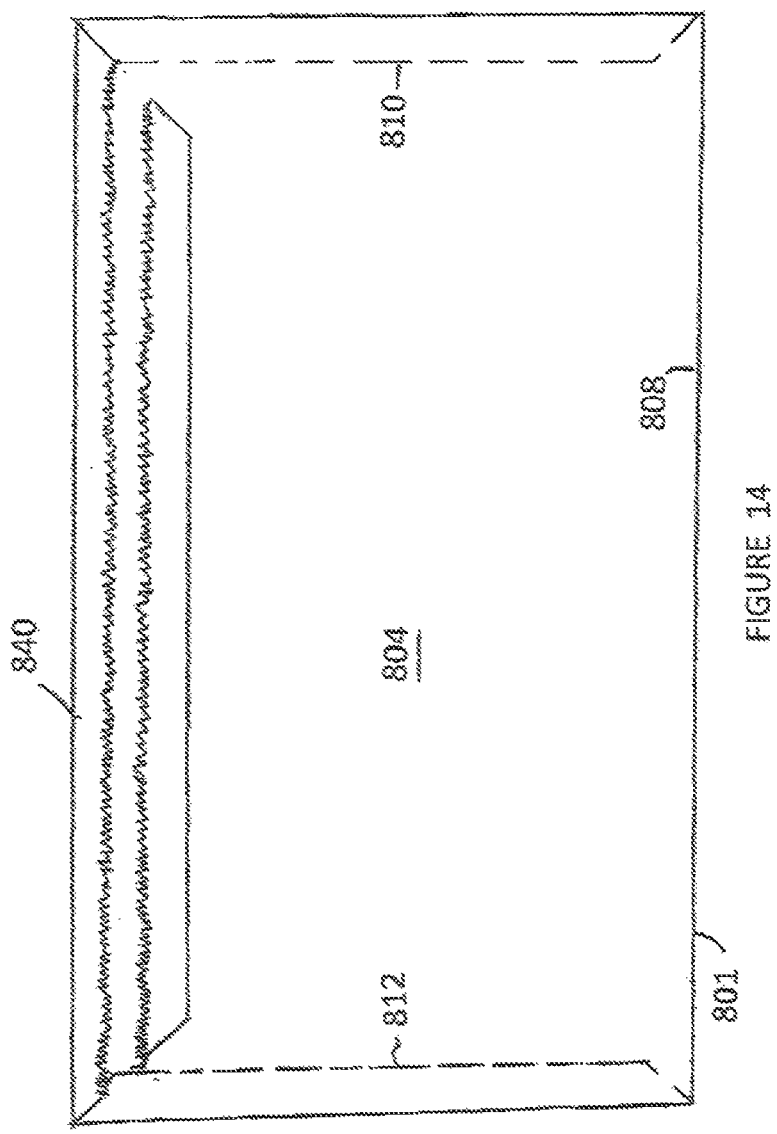
FIG. 14 is a plan view illustrating the sealed reusable envelope of FIG. 11 with the tear strip completely removed.
Figure 13:
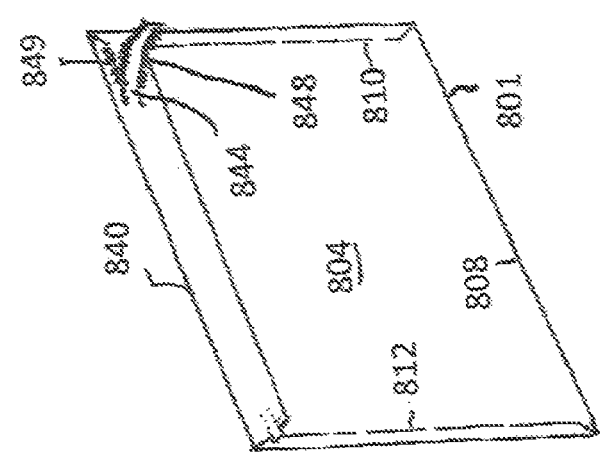
FIG. 13 is a perspective view illustrating the sealed easily openable envelope of FIG. 11 with a first tear strip partially removed.
Figure 15A:
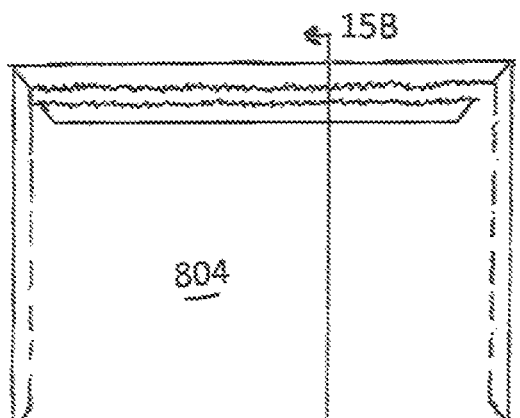
FIGS. 15a and 15b are plan view and cross-sectional view along a line 15b-15b of FIG. 15a, respectively, illustrating the sealed reusable envelope of FIG. 11 with the tear strip completely removed.
Figure 15B:
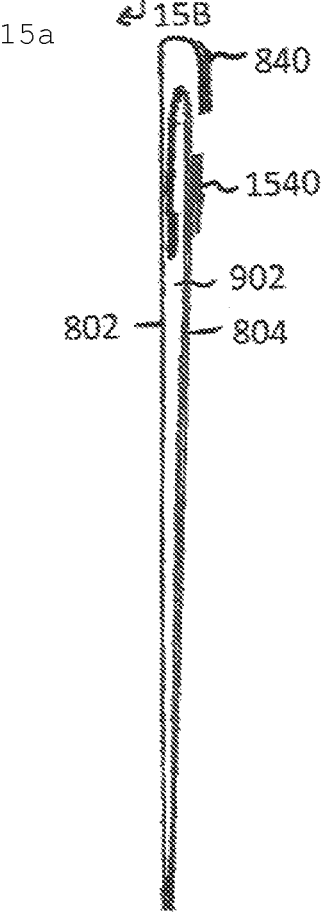

FIG. 13 is a perspective view illustrating the sealed easily openable envelope of FIG. 11 with a first tear strip partially removed. FIG. 14 is a plan view illustrating the sealed reusable envelope of FIG. 11 with the tear strip completely removed. FIGS. 15a and 15b are plan view and cross-sectional view along a line 15b-15b of FIG. 15a, respectively, illustrating the sealed reusable envelope of FIG. 11 with the tear strip completely removed. The envelope 801 is opened by lifting the end of the pull tab 844, and pulling the pull tab 844 along the length of the envelope 801 to tear the sealing flap 840 along the perforation lines 848 and 849. The content retention region 902 is again exposed, enabling visual inspection and removal of the contents therein from the envelope 801. The envelope 801 may be easily opened without the use of tools, such as a letter opener. After unsealing from this configuration, a sealing tab portion 1540 of the sealing flap 840 remains adhered to the front panel 804.

Figure 16A:
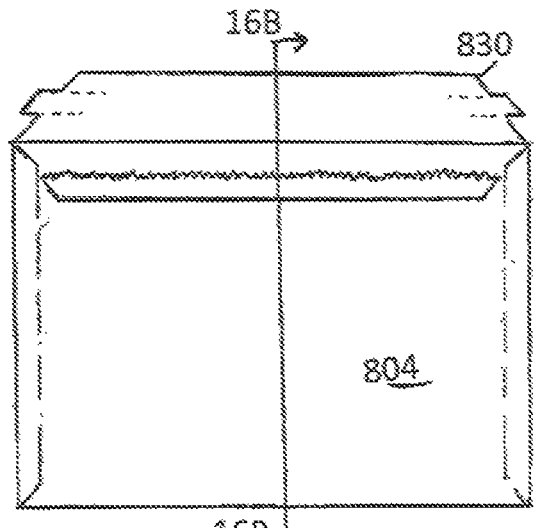
FIGS. 16a and 16b are plan view and cross-sectional view along a line 16b-16b of FIG. 16a, respectively, illustrating the unsealed reusable envelope of FIG. 11 with the tear strip completely removed and a second sealing flap.
Figure 16B:
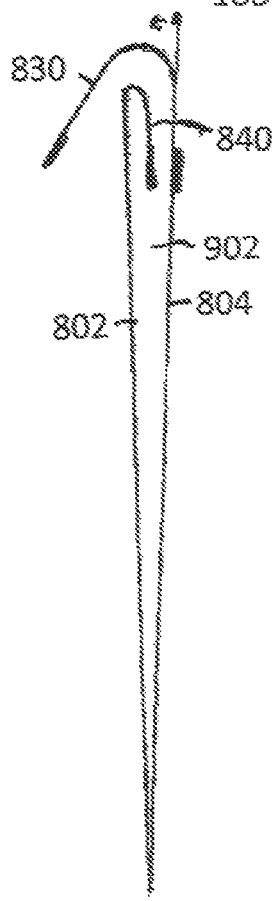

FIGS. 16a and 16b are plan view and cross-sectional view along a line 16b-16b of FIG. 16a, respectively, illustrating the unsealed reusable envelope 801 of FIG. 11 with the tear strip completely removed and a second sealing flap. FIGS. 17a and 17b are plan view and cross-sectional view along a line 17b-17b of FIG. 17a, respectively, illustrating the reusable envelope 801 of FIG. 16 released with the sealing flap 830. The envelope 801 may be resealed by folding the remaining portion of the sealing tab 840 into the envelope 801 and folding the sealing flap 830 along the fold line 832 over the opening towards the back panel 802. The sealing adhesive region 833 is set into an adhesive state (such as removing a plastic strip cover over an adhesive) to engage and hold the sealing flap 830 on the back panel 802 after the sealing flap 830 is folded along the fold line 832 towards the back panel 802 to thereby contact the sealing adhesive region 833 against the back panel 802. The resealed envelope 801 may be readdressed and deposited with a delivery carrier.

Figure 19:
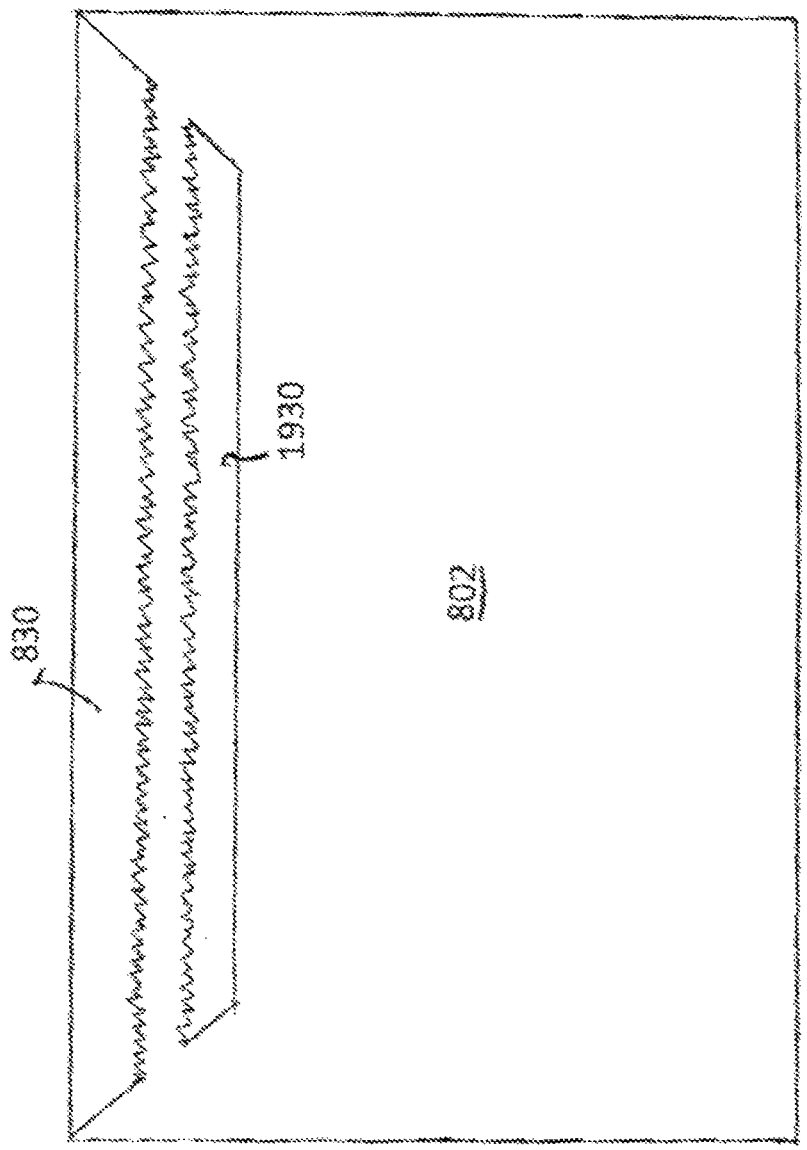
FIG. 19 is a plan view illustrating the sealed reusable envelope of FIG. 17a with the second tear strip completely removed.
Figure 18:
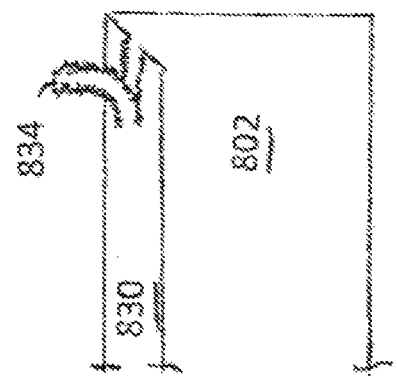
FIG. 18 is a partial plan view illustrating the sealed easily openable envelope of FIG. 17a with a second tear strip partially removed.

FIG. 18 is a partial plan view illustrating the sealed easily openable envelope of FIG. 17a with the tear strip 834 partially removed. FIG. 19 is a plan view illustrating the sealed reusable envelope of FIG. 17a with the tear strip 834 completely removed. FIG. 20 is a plan view illustrating the opened reusable envelope of FIG. 19 with the tear strip 834 completely removed. The envelope 801 is opened by lifting the end of the pull tab 834, and pulling the pull tab 834 along the length of the envelope 801 to tear the sealing flap 830 along the perforation lines 838 and 839. The content retention region 902 is again exposed, enabling visual inspection and removal of the contents therein from the envelope 801. The envelope 801 may be easily opened without the use of tools, such as a letter opener. After unsealing from this configuration, a sealing tab portion 1930 of the sealing flap 840 remains adhered to the back panel 802.

Although the envelope 801 is described with the first sealing using the sealing flap 840 and the second sealing using the sealing flap 830, the envelope 801 may be first sealed using the sealing flap 830 by first folding the sealing flap 840 into the opening and the content retention region 902 of the envelope 801 before sealing the sealing flap 830.

The resealable envelope 801 may be first sealed with the sealing flap 830 and then reused by sealing with the sealing flap 840, or the resealable envelope 801 may be first sealed with the sealing flap 840 and then reused by sealing with the sealing flap 830. Accordingly, the user cannot make a mistake by sealing the resealable envelope 801 with an incorrect order of the sealing flaps.

Mailing boxes are next described.

Figure 21:
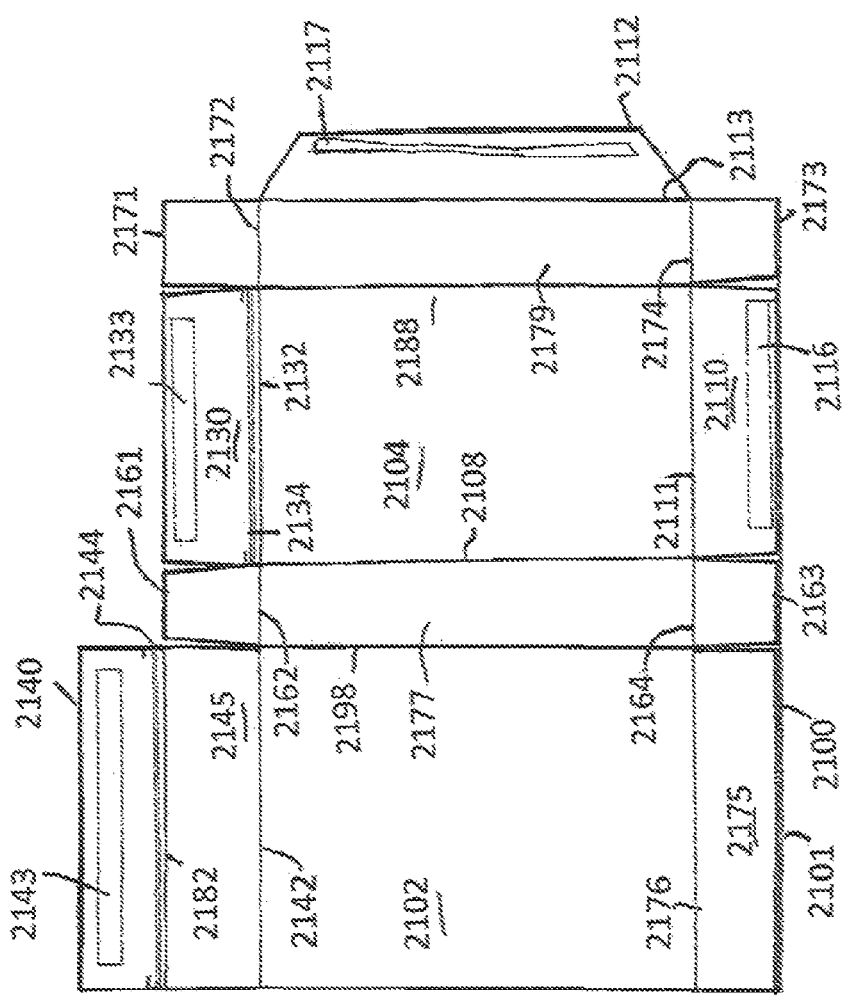
FIG. 21 is a plan view illustrating an unfolded box blank of a reusable mailing box.

FIG. 21 is a plan view illustrating an unfolded box blank 2100 of a reusable mailing box 2101. A first sender may use the reusable mailing box 2101 for a first delivery by sealing and addressing the reusable mailing box 2101. A second sender, such as the recipient of the delivery from the first sender, may use the reusable mailing box 2101 for a second delivery by sealing and readdressing the reusable mailing box 2101 without using external tape.

A back panel 2102 is foldably coupled to and integral with a side panel 2177 along a fold line 2198. A front panel 2104 is foldably coupled to and integral with the side panel 2177 along a fold line 2108 to enable the front panel 2104 to be folded towards an interior surface of the back panel 2102. (The surfaces shown in FIG. 21 are the interior surfaces of the back panel 2102 and the front panel 2104 where interior and exterior are in reference to the box 2101 when assembled as described below.)

A bottom flap 2175 is foldably coupled to and integral with the back panel 2102 along a fold line 2176 that may be perpendicular to the fold line 2198. The bottom flap 2175 may be formed in a generally trapezoidal shape having the long side along the fold line 2176.

A top panel 2161 is foldably coupled to and integral with the side panel 2177 along a fold line 2162 that may be perpendicular to the fold line 2198. The top panel 2161 may be formed in a generally trapezoidal shape having the long side along the fold line 2162. A bottom panel 2163 is foldably coupled to and integral with the side panel 2177 along a fold line 2164 that may be perpendicular to the fold line 2198. The bottom panel 2163 may be formed in a generally trapezoidal shape having the long side along the fold line 2164.

A side panel 2179 is foldably coupled to and integral with the front panel 2104 along a fold line 2188 that may be parallel to the fold line 2108. A top panel 2171 is foldably coupled to and integral with the side panel 2179 along a fold line 2172 that may be perpendicular to the fold line 2188. The top panel 2171 may be formed in a generally trapezoidal shape having the long side along the fold line 2172. A bottom panel 2173 is foldably coupled to and integral with the side panel 2179 along a fold line 2174 that may be perpendicular to the fold line 2188. The bottom panel 2173 may be formed in a generally trapezoidal shape having the long side along the fold line 2174.

A bottom closure flap 2110 is foldably coupled to and integral with the front panel 2104 along a fold line 2111 that may be perpendicular to the fold line 2108. The closure flap 2110 may be formed in a generally trapezoidal shape having the long side along the fold line 2111. A side closure flap 2112 is foldably coupled to and integral with the side panel 2179 along a fold line 2113 that may be parallel to the fold line 2108. The closure flap 2112 may be formed in a generally trapezoidal shape having the long side along the fold line 2113. The closure flaps 2110 and 2112 each may include closure adhesive regions 2116 and 2117, respectively, in a similar manner as the closure adhesive regions 816 and 817 of FIG. 8.

A sealing flap 2130 is foldably coupled to and integral with the front panel 2104 along a fold line 2132 that may be perpendicular to the fold line 2108. The sealing flap 2130 may be formed in a generally trapezoidal shape having the long side along the fold line 2132. A sealing adhesive region 2133 may be disposed parallel to the fold line 2132 near the edge of the sealing flap 2130 that is opposite the fold line 2132. The sealing adhesive region 2133 seals the box in a closed configuration (see FIG. 29). A tear strip 2134 extends along the length of the sealing flap 2130 to enable opening of the box 2101 by pulling the tear strip 2134. Perforation lines may be disposed on opposite sides of the tear strip 2134 and extending along the length of the sealing flap 2130 to enable opening of the box 2101 by forming lines of weakness when the tear strip 2134 is pulled.

A sealing flap 2140 is foldably coupled to and integral with the back panel 2102 along a fold line 2142 that may be perpendicular to the fold line 2198. The sealing flap 2140 may be formed in a generally trapezoidal shape having the long side along the fold line 2132. The sealing flap 2140 includes an extension region 2145 disposed adjacent the fold line 2142 to extend the sealing flap 2140 to be higher than the sealing flap 2130. (The extension region 2145 allows the sealing flap 2140 to fold over the opening of the box 2101 to contact the front panel 2104 when the box 2101 is sealed using the sealing flap 2140.) A sealing adhesive region 2143 may be disposed parallel to the fold line 2182 near the edge of the sealing flap 2140 that is opposite the fold line 2182. The sealing adhesive region 2143 seals the envelope in a closed configuration (see FIG. 26). A tear strip 2144 extends along the length of the sealing flap 2140 to enable opening of the envelope 2101 by pulling the tear strip 2144. Perforation lines may be disposed on opposite sides of the tear strip 2144 and extending along the length of the sealing flap 2140 to enable opening of the box 2101 by forming lines of weakness when the tear strip 2144 is pulled.

In some embodiments, the distance between the fold lines 2145 and 2145 is sufficient so that the extension region 2145 covers the opening of the box 2101 (e.g., wider than the width of the opening) when sealing the box 2101 as described below.

In some embodiments, the tear strip 2144 is formed in the extension region 2145, and the distance between the sealing adhesive region 2133 of the sealing flap 2130 is sufficient so that the sealing flap 2130 covers the opening of the box 2101 (e.g., wider than the width of the opening) when sealing the box 2101 as described below.

Figure 32:
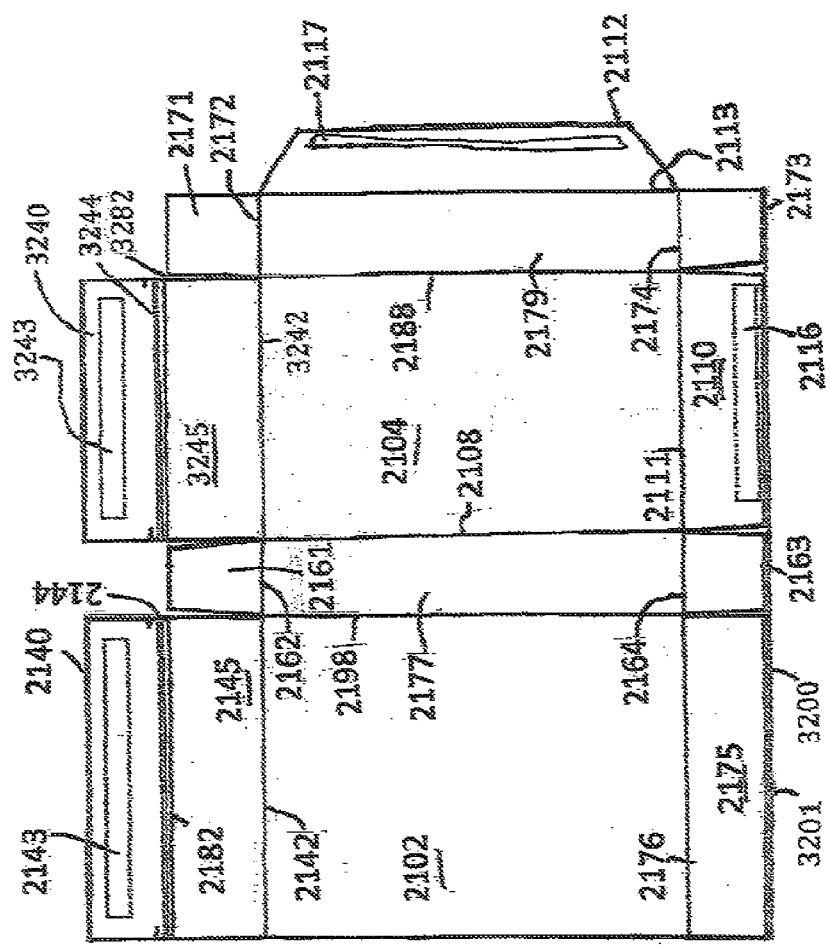
FIG. 32 is a plan view illustrating an unfolded box blank of a reusable mailing box according to another embodiment.

In some embodiments, the sealing flap 2130 includes an extension region similar to the extension region 2145 of the sealing flap 2140. In such embodiments, the extension region of the sealing flap 2130 may have a different width (relative to the perpendicular direction of the fold line 2132) than that of the extension region 2145. FIG. 32 is a plan view illustrating an unfolded box blank 3200 of a reusable mailing box 3201 according to another embodiment. The blank 3200 is similar to the blank 2100, but further includes a sealing flap 3240 and an extension flap 3245 instead of a sealing flap 2130. A fold line 3242 between the extension flap 3245 and the panel 2104 is similar to the fold line 2132 (FIG. 21). A fold line 3244 between the extension flap 3245 and the sealing flap 3282 is similar to the fold line 2182 (FIG. 21). A sealing adhesive region 3243 and a tear strip 3244 are similar to the sealing adhesive region 2143 and the tear strip 2144, respectively (FIG. 21).

Figure 22:
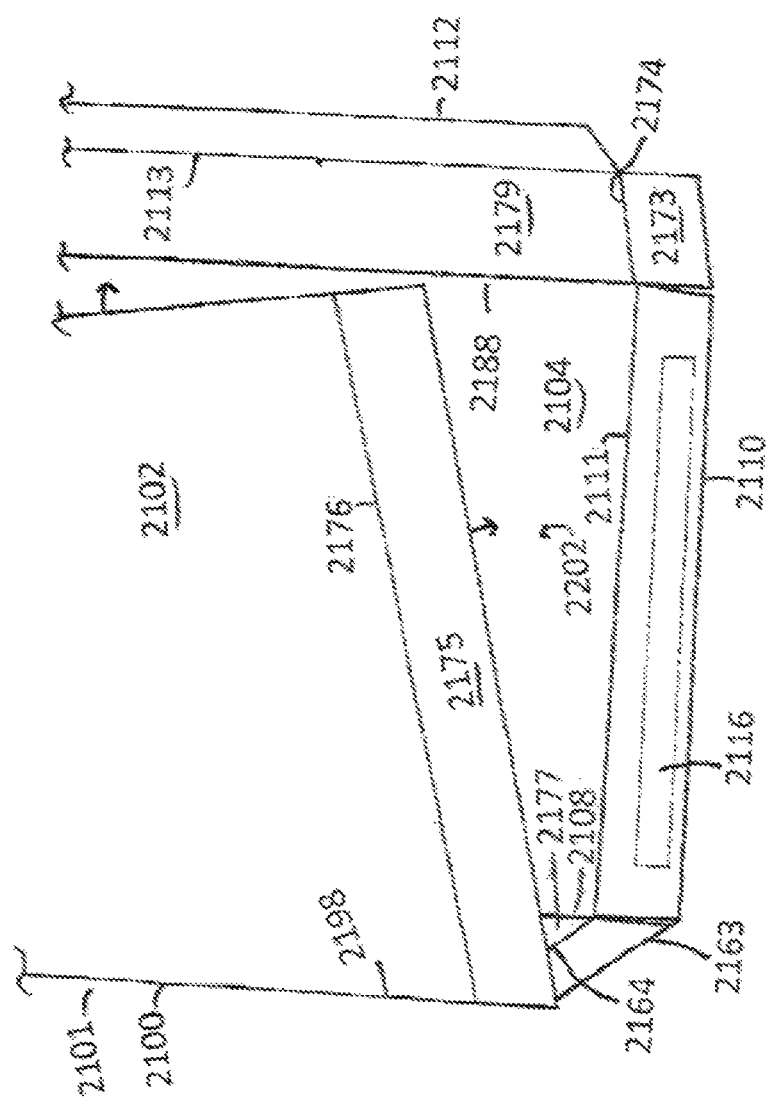
FIG. 22 is a partial perspective view illustrating a reusable mailing box partially assembled from the box blank of FIG. 21.

FIG. 22 is a partial perspective view illustrating the reusable mailing box 2101 partially assembled from the box blank 2100. The back panel 2102 and the front panel 2104 are folded toward each other along the fold lines 2108 and 2198, respectively, to form a content retention region 2202 therebetween. The side panel 2179 is folded along the fold line 2188 to form a side of the content retention region 2202 of the box 2101, and is sealed to the back panel 2102 using the closure flap 2212 folded to engage the back panel 2102 with the closure adhesive region 2117 set into an adhesive state (such as removing a plastic strip cover over an adhesive or using glue as an adhesive) to engage and hold the closure flap 2212 against the back panel 2102 to seal the side of the box 2101. At this semi-assembled stage, the reusable mailing box 2101 may be folded flat with the back panel 2102 and the front panel 2104 in contact with each other. In this stage, the semi-assembled mailing box 2101 may be stacked and stored, and provided to a sender who will complete assembly for use of the reusable mailing box 2101.

The reusable mailing box 2101 is assembled and completed. The bottom flaps 2163 and 2173 are folded along the fold lines 2164 and 2174, respectively, to partially close a bottom of the box 2101. The bottom flap 2175 is folded along the fold line 2176 to further close the bottom of the box 2101. The bottom flap 2110 is folded along the fold line 2111 to contact the bottom flap 2175 with the closure adhesive region 2116 set into an adhesive state (such as removing a plastic strip cover over an adhesive) to engage and hold the bottom panel 2110 against the bottom flap 2175 to seal the bottom of the box 2101.

The flaps 2175, 2163, 2110, 2173, 2171, 2761 and 2112 may be arranged on various sides of the back panel 2102 and the front panel 2104 to form an opening of the box 2101.

Figure 23:
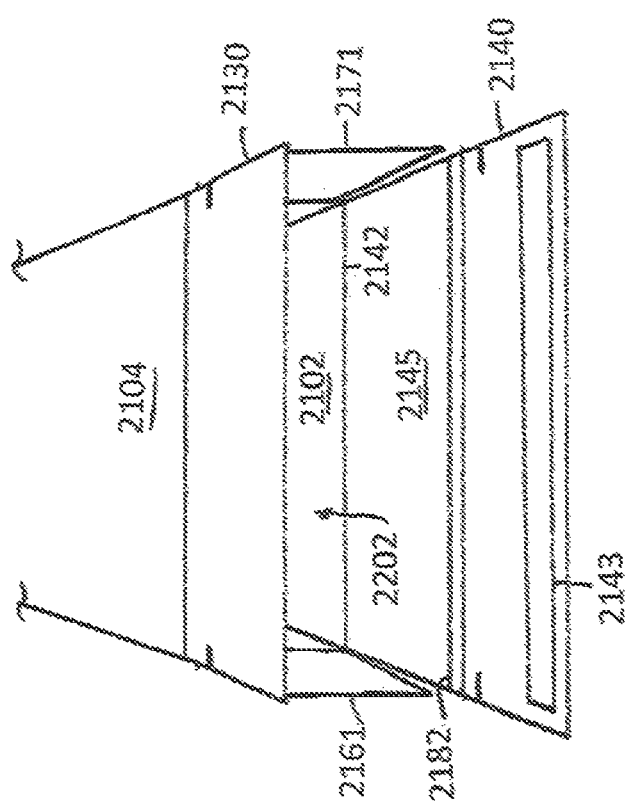
FIG. 23 is a partial perspective view illustrating an unsealed reusable mailing box assembled from the box blank of FIG. 21.
Figure 24:
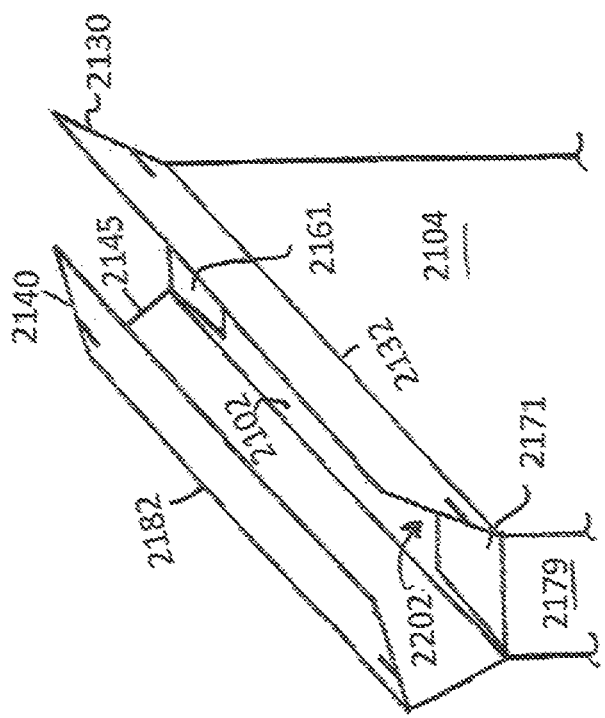
FIGS. 24 and 25 are partial perspective views illustrating sealing of the mailing box using the shorter flap for the first sealing of the mailing box.
Figure 25:
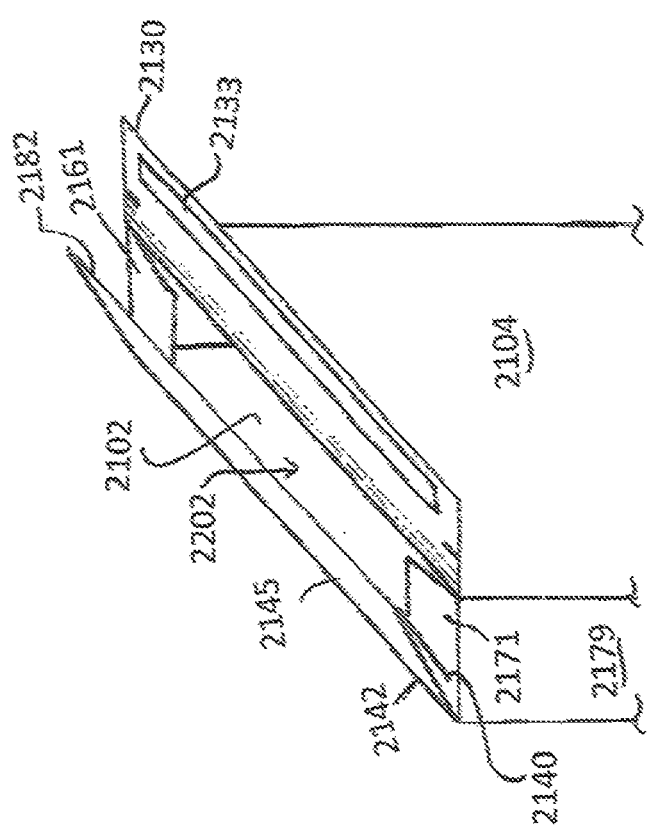

FIG. 23 is a partial perspective view illustrating an unsealed reusable mailing box 2101 assembled from the box blank 2100. FIGS. 24 and 25 are partial perspective views illustrating sealing of the mailing box using the shorter flap 2130 for the first sealing of the mailing box 2101.

In the initial sealing of the envelope 2101, either the sealing flap 2130 or the sealing flap 2140 may be used to seal the box 2101. A first configuration is described in conjunction with FIGS. 23-25 in which the sealing flap 2140 is used to first seal the box 2101. The sealing flap 2140 is folded along the fold line 2182 so that the sealing flap 2140 is folded over against the extension region 2145. (Alternatively, the sealing flap 2140 may be folded into the content retention region.) The box 2101 is sealed by folding the sealing flap 2130 along the fold line 2132 towards the back panel 2102. The sealing adhesive region 2133 is set into an adhesive state (such as removing a plastic strip cover over an adhesive) to engage and hold the sealing flap 2130 on the extension region 2145. The sealed box 2101 may be addressed and deposited with a delivery carrier.

Figure 26:
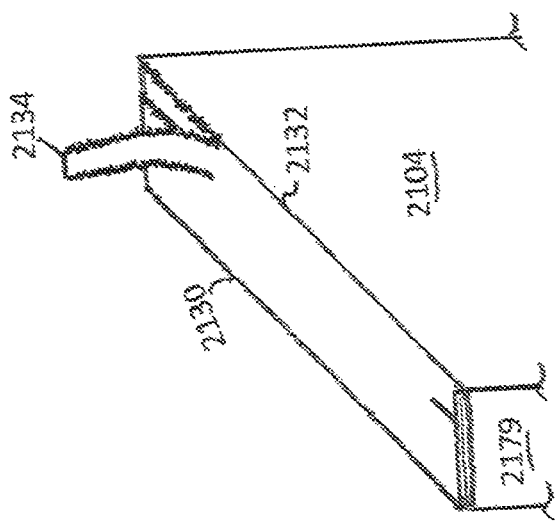
FIG. 26 is a partial perspective view illustrating the mailing box with a first tear strip partially removed.

FIG. 26 is a partial perspective view illustrating the mailing box 2101 with a first tear strip partially removed. FIG. 27 is a partial perspective view illustrating the mailing box 2101 with a first tear strip completely removed. FIG. 28 is a partial perspective view illustrating the mailing box 2101 with a first tear strip completely removed and the mailing box 2101 opened. The box 2101 is opened by lifting the end of the tear strip 2134, and pulling the tear strip 2134 along the length of the box 2101 to tear the sealing flap 2130. The content retention region 2202 is again exposed, enabling visual inspection and removal of the contents therein from the box 2101. After unsealing from this configuration, a sealing tab portion 2730 of the sealing flap 2130 remains adhered to the extension region 2145 after tearing of the sealing flap 2130 and opening of the box 2101.

Figure 29:
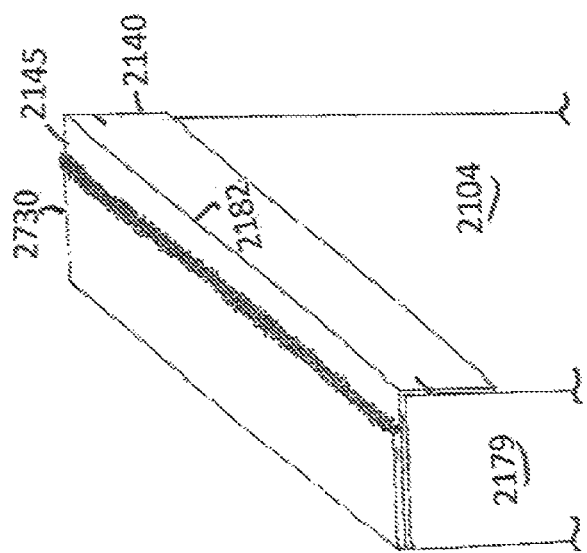
FIG. 29 is a partial perspective view illustrating the mailing box sealed with the second sealing flap.

FIG. 29 is a partial perspective view illustrating the mailing box sealed with the second sealing flap. The box 2101 may be resealed by folding the sealing flap 2140 along the fold line 2142 over the opening towards the front panel 2104. The sealing adhesive region 2143 is set into an adhesive state (such as removing a plastic strip cover over an adhesive) to engage and hold the sealing flap 2140 on the front panel 2104 after the sealing flap 2140 is folded along the fold line 2142 towards the front panel 2104 to thereby contact the sealing adhesive region 2143 against the front panel 2104. The resealed box 2101 may be readdressed and deposited with a delivery carrier.

FIG. 30 is a partial perspective view illustrating the mailing box with a second tear strip partially removed. FIG. 31 is a partial perspective view illustrating the mailing box with the second tear strip completely removed and the mailing box opened.

The box 2101 is opened by lifting the end of the tear strip 2144, and pulling the tear strip 2144 along the length of the box 2101 to tear the sealing flap 2140. The content retention region 2202 is again exposed, enabling visual inspection and removal of the contents therein from the box 2101.

Although the box 2101 is described with the first sealing using the sealing flap 2130 and the second sealing using the sealing flap 2140, the box 2101 may be first sealed using the sealing flap 2140 by first folding the sealing flap 2130 over the opening of the box 2101 before sealing the sealing flap 2140.

The resealable box 2101 may be first sealed with the sealing flap 2130 and then reused by sealing with the sealing flap 2140, or the resealable box 2101 may be first sealed with the sealing flap 2140 and then reused by sealing with the sealing flap 2130. Accordingly, the user cannot make a mistake by sealing the resealable box 2101 with an incorrect order of the sealing flaps.

The flaps have been described herein as being generally trapezoidal shaped as an illustrative example for reducing the amount of material in the blanks; other suitable shapes of flaps may be used for other purposes.

The fold lines described herein may be, for example, crease lines.

The envelope and box blanks may be formed of paper, paperboard, cardboard, flexible plastic, or other material suitable for folding or shipping.

The envelopes, mailing boxes, and shipping containers may include cushioning material (e.g., bubble packaging) disposed on the insider thereof for protecting the contents therein. The envelopes, mailing boxes, and shipping containers may include indicia, instructional material or graphics.

The envelopes, boxes and document containers described herein may include appropriately located legends or indicia, such as "OPEN HERE", "PULL HERE" and "FOLD HERE," to instruct the user how to open or seal the envelopes and document containers.

The sender may add delivery indicia on the envelopes, mailing boxes, and shipping containers. The delivery indicia may also indicate an area on envelopes, mailing boxes, and shipping containers for affixing a delivery or addressee label.

All United States patents, United States patent applications, publications and any other documents referenced, described or cited herein are incorporated herein by reference in their entity as if each were specifically and individually indicated to be incorporated by reference in its entirety.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A multi-use mailer comprising:
first and second panels being permanently sealed to form a content retention region therebetween and having an opening to allow the item to be inserted into and removed from the content retention region, each of the first and second panels having an outside wall opposite the content retention region;
a first closure flap comprising a first portion and a second portion, the first portion foldably attached to the first panel along a first fold line along the opening and the second portion foldably attached to the first portion along a second fold line so that the first closure flap covers the opening and contacts the outside wall of the second panel in a first sealed configuration after the first portion is folded along the first fold line and the second portion is folded along the second fold line;
a second closure flap foldably attached to the second panel along a third fold line so that the second closure flap is configured to be folded into the opening in the first sealed configuration and covers the opening and contacts the first closure flap or the outside wall of the first panel in a second sealed configuration;
a first adhesive region extending along the second portion of the first closure flap generally parallel to the second fold line and contacting the outside wall of the second panel when the first closure flap is folded along the first fold line and the second fold line in the first sealed configuration; and
a second adhesive region extending along the second closure flap generally parallel to the third fold line and contacting the first closure flap or the outside wall of the first panel when the second closure flap is folded along the third fold line in the second sealed configuration,
wherein the first closure flap includes a first tear strip between the first adhesive region and the second fold line and extending along the first closure flap generally parallel to the second fold line, the first tear strip being removable from the first closure flap to separate the first closure flap to allow a portion of the first closure flap to be unfolded to unseal the mailer,
wherein the second closure flap includes a second tear strip between the second adhesive region and the third fold line and extending along the second closure flap generally parallel to the third fold line, the second tear strip being removable from the second closure flap to separate the second closure flap to allow a portion of the second closure flap to be unfolded to unseal the mailer.

2. The multi-use mailer of claim 1, further comprising first and second side walls and a bottom wall between the first and second panels to form the mailer in a box shape.

3. The multi-use mailer of claim 2, wherein a distance between the first fold line and the first adhesive region of the first closure flap is greater than a distance between the first and second panels when the mailer is in the box shape.

4. The multi-use mailer of claim 1, wherein the first closure flap is further configured to be folded into the opening in the second sealed configuration.

5. The multi-use mailer of claim 4, further comprising first and second side walls and a bottom wall between the first and second panels to form the mailer in a box shape.

6. The multi-use mailer of claim 4, wherein a distance between the first fold line and the first adhesive region of the first closure flap is greater than a distance between the first and second panels when the mailer is in the box shape.

7. An item shipping container comprising:
a housing configured to retain an item therein and having an opening for inserting or removing the item therefrom;
a first sealing flap disposed on the housing adjacent the opening, the first sealing flap comprising a first portion attached to the housing along a first fold line and a second portion attached to the first portion along a second fold line and including a first adhesive region;
a second sealing flap disposed on the housing adjacent the opening along a third fold line, the second sealing flap including a second adhesive region,
wherein, in a first configuration, the first sealing flap is configured to be folded along the first fold line into the housing or across the opening and the second sealing flap is configured to be folded along the third fold line over the opening to contact the second adhesive region to a side of the housing external to the opening and opposite the third fold line or the first sealing flap to seal the housing before the housing is sealed in a second configuration
wherein, in the second configuration, the second sealing flap is configured to be folded along the third fold line into the housing or across the opening and the first sealing flap is configured to be folded along the first fold line across the opening and along the second fold line to contact the first adhesive region to a side of the housing external to the opening and opposite the first fold line to seal the housing after the housing is sealed in the first configuration and opened using the second sealing flap,
wherein the first sealing flap includes a first tear strip configured to separate a third portion of the first sealing flap from a fourth portion of the first sealing flap to unseal the housing in the second configuration; and
wherein the second sealing flap includes a second tear strip configured to separate a fifth portion of the second sealing flap from a sixth portion of the second sealing flap to unseal the housing in the first configuration.

8. The item shipping container of claim 7, wherein the first sealing flap is longer than the second sealing flap before the housing is sealed.

9. The item shipping container of claim 7, wherein the housing is a box.

10. The item shipping container of claim 7, wherein the housing, the first sealing flap and the second sealing flap are formed from a single contiguous container blank.

11. The item shipping container of claim 7, wherein the housing has a permanently sealable bottom opposite the opening.

12. The item shipping container of claim 7, wherein, in the first configuration, the second sealing flap is further configured to be folded along the third fold line over the opening to contact the second adhesive region to the side of the housing external to the opening and opposite the third fold line or the first sealing flap to seal the housing before the housing is sealed in the second configuration in the event that the housing has not been sealed in the second configuration and to seal the housing after the housing has been sealed in the second configuration and after being unsealed in the event that the housing has been sealed in the second configuration,
wherein, in the second configuration, the first sealing flap is further configured to be folded along the first fold line across the opening and along the second fold line to contact the first adhesive region to the side of the housing external to the opening and opposite the first fold line to seal the housing after the housing is sealed in the first configuration and opened using the second sealing flap in the event that the housing has been sealed in the first configuration and to seal the housing before the housing is sealed in the first configuration in the event that the housing has not been sealed in the first configuration.

13. The item shipping container of claim 12, wherein the first sealing flap is longer than the second sealing flap before the housing is sealed.

14. The item shipping container of claim 12, wherein the housing is a box.

15. The item shipping container of claim 12, wherein the housing, the first sealing flap and the second sealing flap are formed from a single contiguous container blank.

16. The item shipping container of claim 12, wherein the housing has a permanently sealable bottom opposite the opening.

* * * * *